(12) United States Patent
Rolfes et al.

(10) Patent No.: US 11,794,422 B2
(45) Date of Patent: Oct. 24, 2023

(54) BEADED PANELS AND SYSTEMS AND METHODS FOR FORMING BEADED PANELS

(71) Applicant: The Boeing Company, Chicago, IL (US)

(72) Inventors: Corey A. Rolfes, Everett, WA (US); Charles L Norman, IV, Olympia, WA (US); Adriana Willempje Blom-Schieber, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/548,733

(22) Filed: Dec. 13, 2021

(65) Prior Publication Data
US 2023/0182408 A1 Jun. 15, 2023

(51) Int. Cl.
| | |
|---|---|
| B32B 3/28 | (2006.01) |
| B29C 70/34 | (2006.01) |
| B29C 65/08 | (2006.01) |
| B29C 65/20 | (2006.01) |
| B29C 65/32 | (2006.01) |
| B32B 7/05 | (2019.01) |
| B32B 5/26 | (2006.01) |
| B32B 7/14 | (2006.01) |
| B29L 31/30 | (2006.01) |

(52) U.S. Cl.
CPC ............ *B29C 70/345* (2013.01); *B29C 65/08* (2013.01); *B29C 65/20* (2013.01); *B29C 65/32* (2013.01); *B32B 3/28* (2013.01); *B32B 5/26* (2013.01); *B32B 7/05* (2019.01); *B32B 7/14* (2013.01); *B29L 2031/3076* (2013.01); *B32B 2250/02* (2013.01); *B32B 2250/03* (2013.01); *B32B 2250/04* (2013.01); *B32B 2250/20* (2013.01); *B32B 2260/023* (2013.01); *B32B 2260/046* (2013.01)

(58) Field of Classification Search
CPC .... B32B 3/28; B32B 5/26; B32B 7/05; B32B 7/14; B32B 2250/02; B32B 2250/03; B32B 2250/04; B32B 2250/20; B32B 2260/023; B32B 2260/046; Y10T 428/24
See application file for complete search history.

(56) References Cited

U.S. PATENT DOCUMENTS 4,409,274 A * 10/1983 Chaplin .................... B32B 3/28
428/184
8,443,575 B1 * 5/2013 Tanner .................. B64C 1/1446
244/129.4

(Continued)

FOREIGN PATENT DOCUMENTS

| FR | 3043062 | 5/2017 |
|---|---|---|
| WO | WO 2017/072298 | 5/2017 |
| WO | WO 2017/072459 | 5/2017 |

OTHER PUBLICATIONS

European Patent Office, Extended European Search Report, App. No. 22212040.4 (Jun. 19, 2023.

*Primary Examiner* — David Sample
*Assistant Examiner* — Donald M Flores, Jr.
(74) *Attorney, Agent, or Firm* — Walters & Wasylyna LLC

(57) ABSTRACT

A beaded panel includes a base panel and a beaded panel doubler made of a first fiber-reinforced thermoplastic composite. The beaded panel doubler is joined to the base panel to supplement a stiffness of the base panel.

19 Claims, 18 Drawing Sheets

(56) References Cited

U.S. PATENT DOCUMENTS

| | | |
|---|---|---|
| 10,994,823 B2 | 5/2021 | Cominsky |
| 2005/0140177 A1 | 6/2005 | Montagna et al. |
| 2014/0044914 A1 | 2/2014 | Kurtz et al. |

* cited by examiner

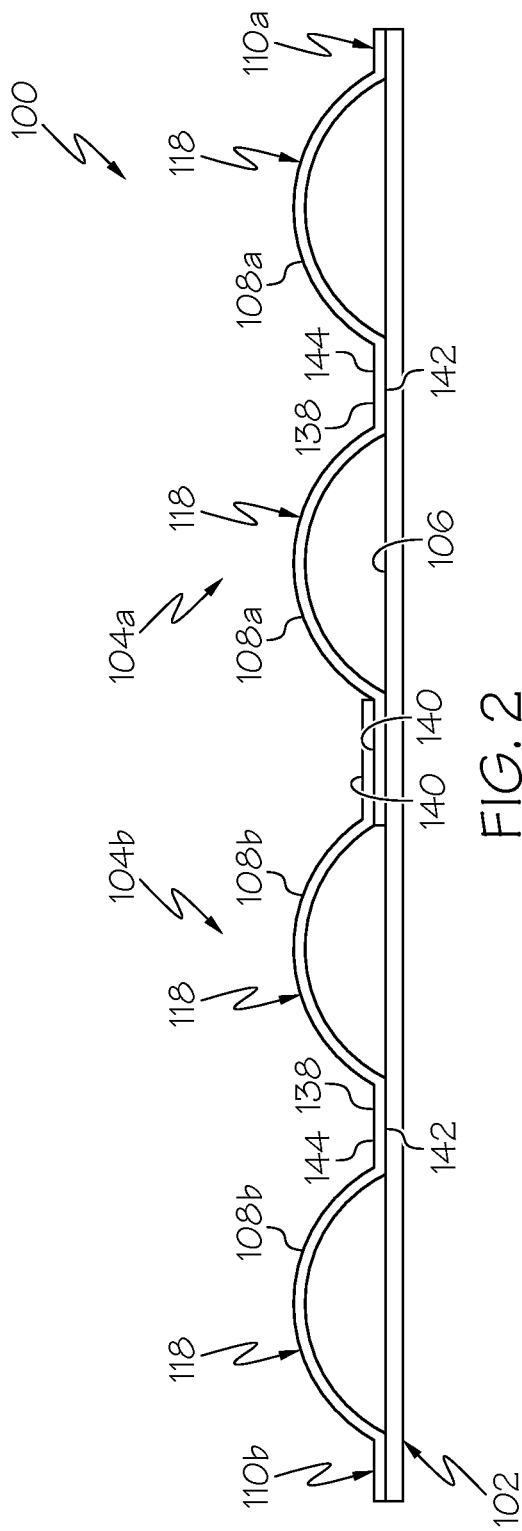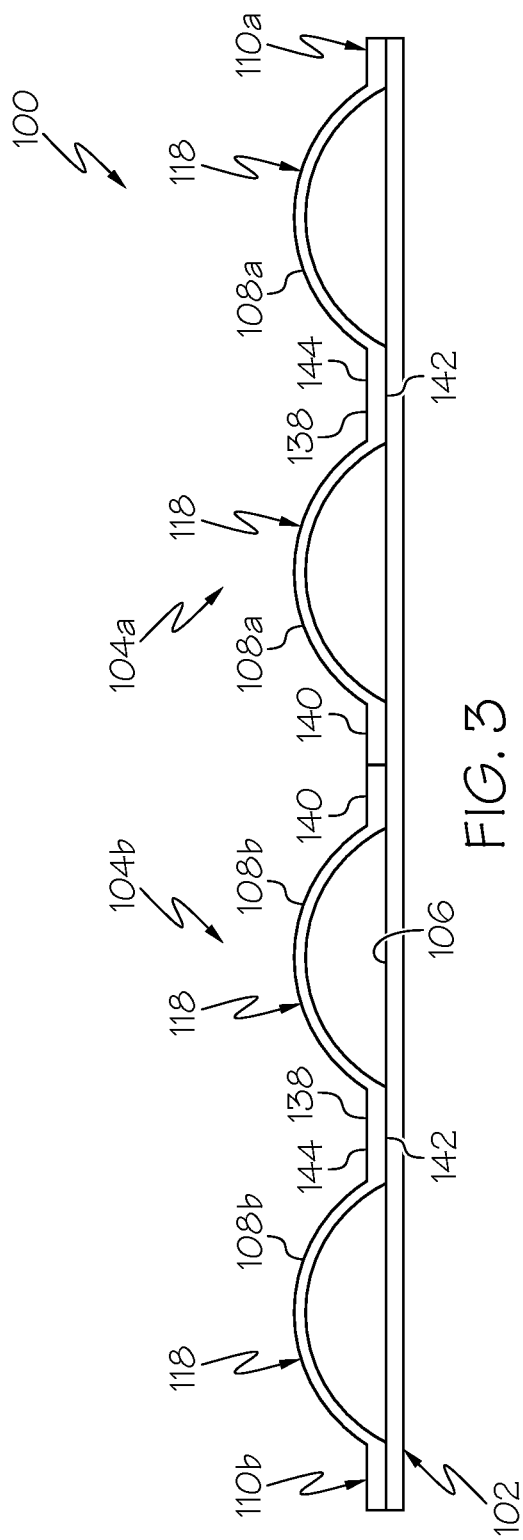

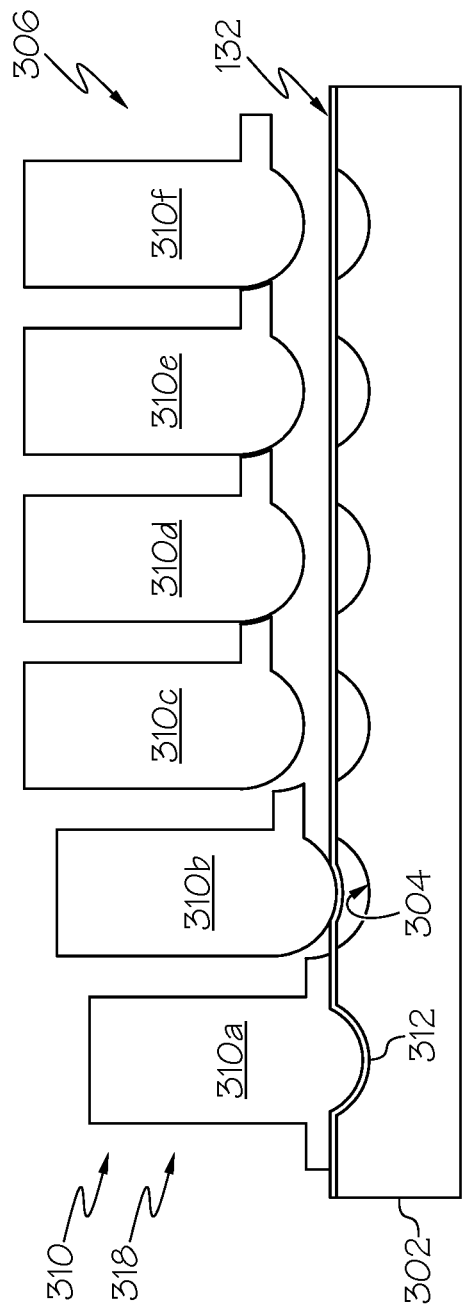
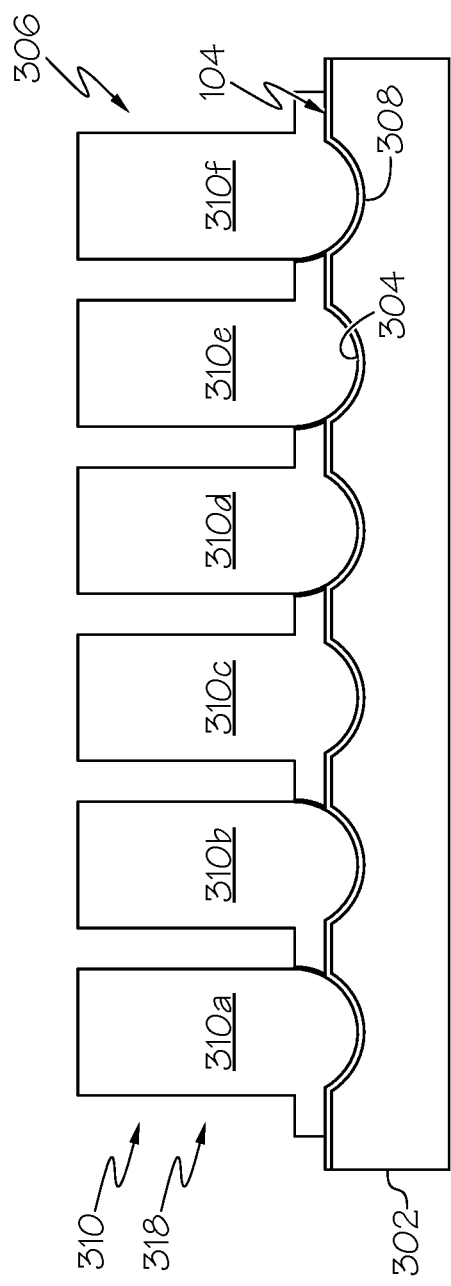

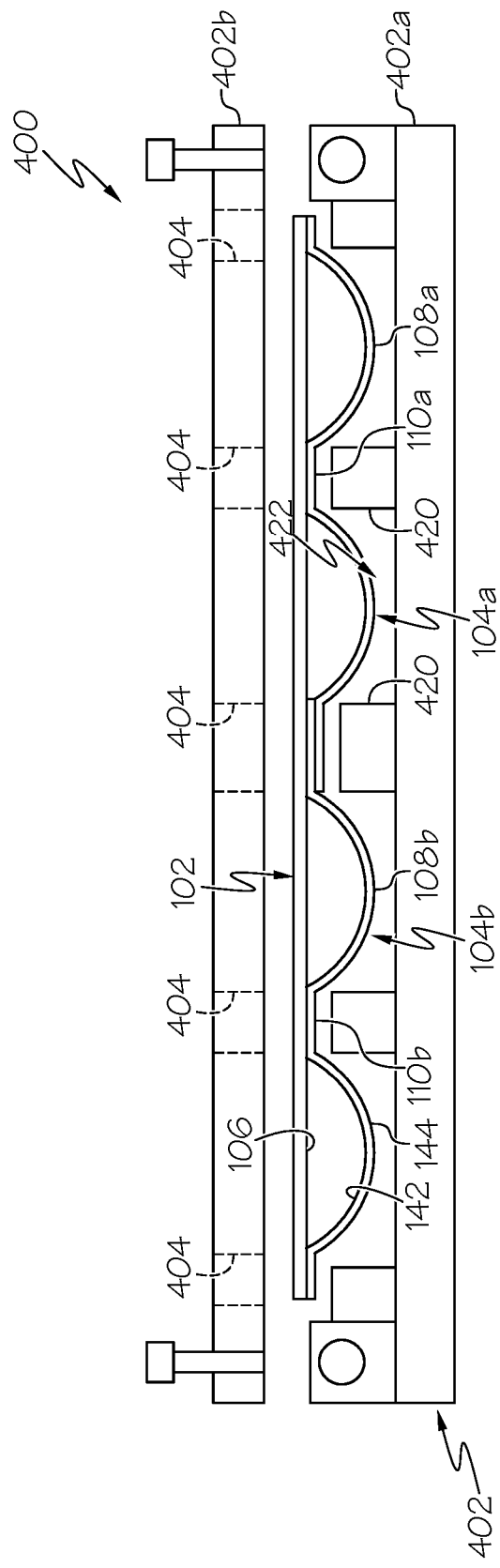
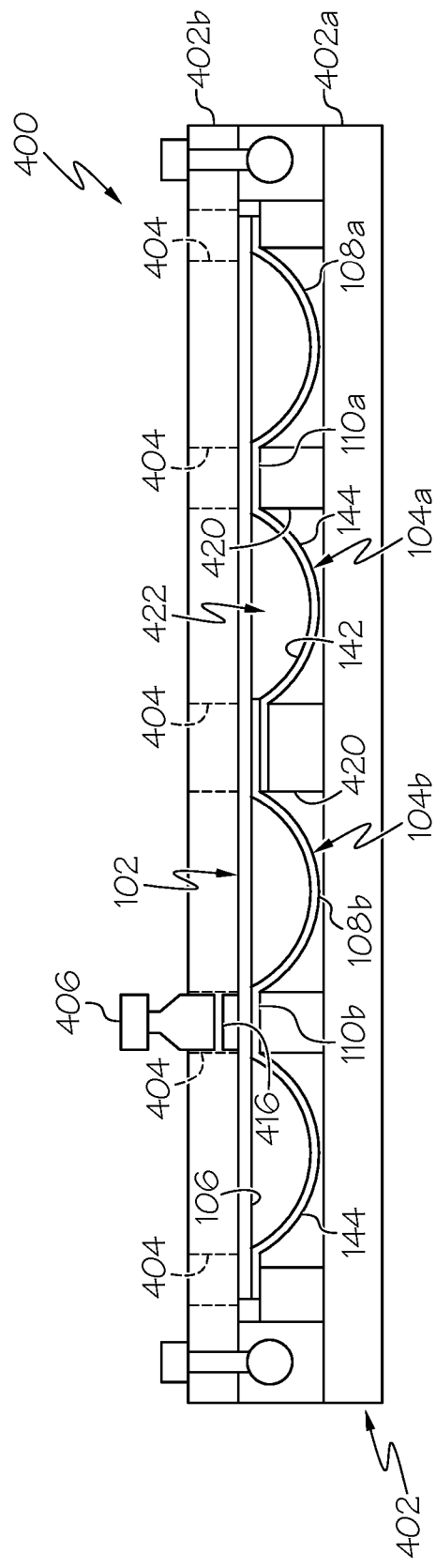

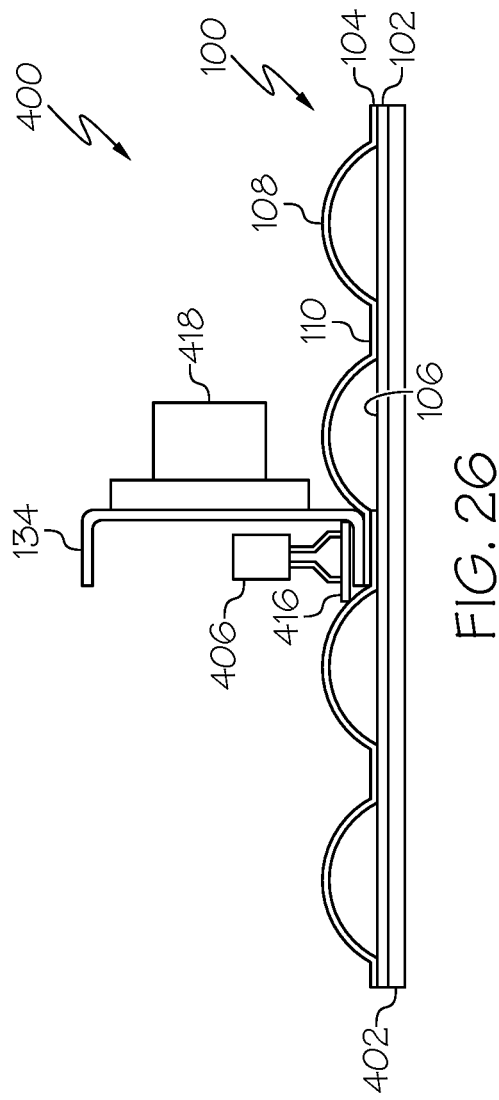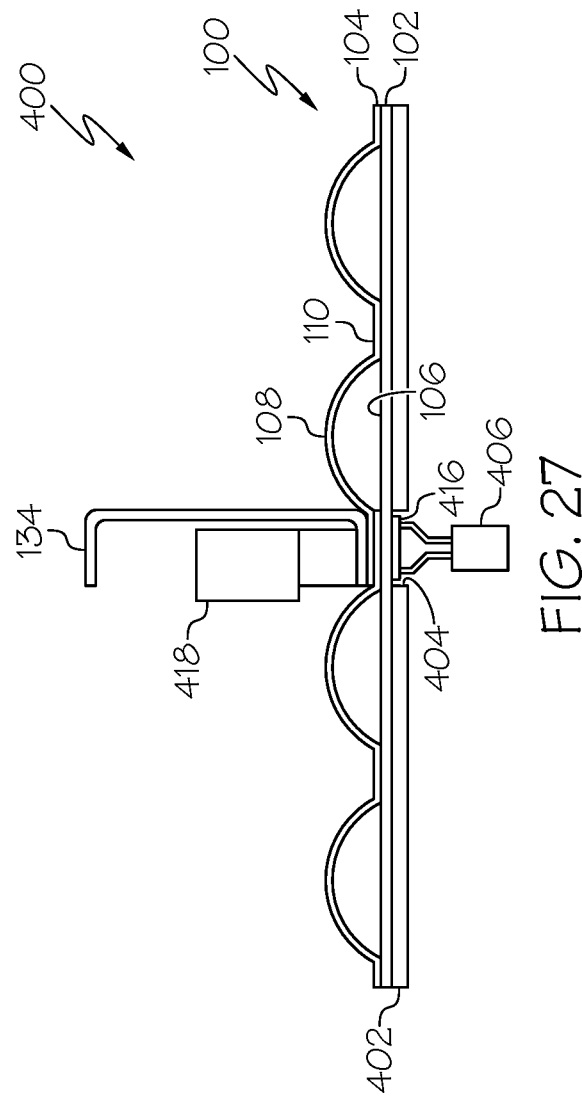

US 11,794,422 B2

BEADED PANELS AND SYSTEMS AND METHODS FOR FORMING BEADED PANELS

FIELD

The present disclosure relates generally to panel manufacturing and, more particularly, beaded panels and systems and methods for forming beaded panels.

BACKGROUND

Thin composite panels are used in a variety of applications as structural components, such as in aircraft, aerospace vehicles, automobiles, marine vehicles, and the like. The light-weight properties of the thin panels are desirable for various applications. However, the bending stiffness of such thin composite panels may be less than desirable for these same applications. To improve the stiffness of the composite panel, elongated stiffeners (e.g., made of composite or metal) may be joined to a surface of the composite panel. However, fabricating the stiffeners and joining the stiffeners to the composite panel increases manufacturing costs and cycle times. Accordingly, those skilled in the art continue with research and development efforts in the field of composite manufacturing.

SUMMARY

Disclosed are examples of a beaded panel, a system for fabricating a beaded panel, a stamp forming apparatus for forming a beaded panel doubler, a welding apparatus for forming a beaded panel, and a method for forming a beaded panel. The following is a non-exhaustive list of examples, which may or may not be claimed, of the subject matter according to the present disclosure.

In an example, the disclosed beaded panel includes a base panel and a beaded panel doubler made of a first fiber-reinforced thermoplastic composite. The beaded panel doubler is joined to the base panel to supplement a stiffness of the base panel.

In an example, the disclosed system includes a panel forming apparatus configured to form a beaded panel doubler. The beaded panel doubler is made of a thermoplastic material and includes beads and a web that interconnects the beads. The system also includes a panel joining apparatus configured to join at least a portion of the web of the beaded panel doubler to a base panel.

In an example, the disclosed stamp forming apparatus includes a first die including a first die surface and a second die including a second die surface. The second die includes die segments. Each one of the die segments includes a die-segment surface that forms a portion of the second die surface. The first die surface and the second die surface are complementary. The die segments are actuated according to a predetermined sequence to sequentially form beads and portions of a web that interconnects the beads in a blank.

In an example, the disclosed welding apparatus includes a jig configured to clamp a base panel and a beaded panel doubler, together. The welding apparatus also includes a welding head configured to thermally weld the base panel and the beaded panel doubler together. The beaded panel doubler is made of a first fiber-reinforced thermoplastic composite. The base panel is made of a second fiber-reinforced thermoplastic composite. The jig includes openings that provide access to a portion of at least one of the base panel and the beaded panel doubler. The welding head is configured to thermally weld the base panel and a portion of the beaded panel doubler together along the openings.

In an example, the disclosed method includes steps of: (1) forming a beaded panel doubler made of a first thermoplastic material and including beads and a web that interconnects the beads; and (2) joining at least a portion of the web of the beaded panel doubler and a base panel together.

Other examples of the disclosed beaded panel, system, stamping apparatus, welding apparatus, and method will become apparent from the following detailed description, the accompanying drawings, and the appended claims.

BRIEF DESCRIPTION OF THE DRAWINGS

FIG. 2 is a schematic, elevation, sectional view of an example of the beaded panel;

FIG. 3 is a schematic, elevation, sectional view of an example of the beaded panel;

FIG. 22 is a schematic illustration of an example of a portion of the stamp forming apparatus, depicting a stage of a process for forming the beaded panel doubler;

FIG. 23 is a schematic illustration of an example of a portion of the stamp forming apparatus, shown in FIG. 22, depicting a subsequent stage of the process for forming the beaded panel doubler;

FIG. 24 is a schematic, elevation, exploded, sectional view of an example of a portion of the welding apparatus;

FIG. 25 is a schematic, elevation, sectional view of an example of the welding apparatus;

FIG. 26 is a schematic, elevation, sectional view of an example of a portion of the welding apparatus;

FIG. 27 is a schematic, elevation, sectional view of an example of a portion of the welding apparatus;

DETAILED DESCRIPTION

Figure 1:
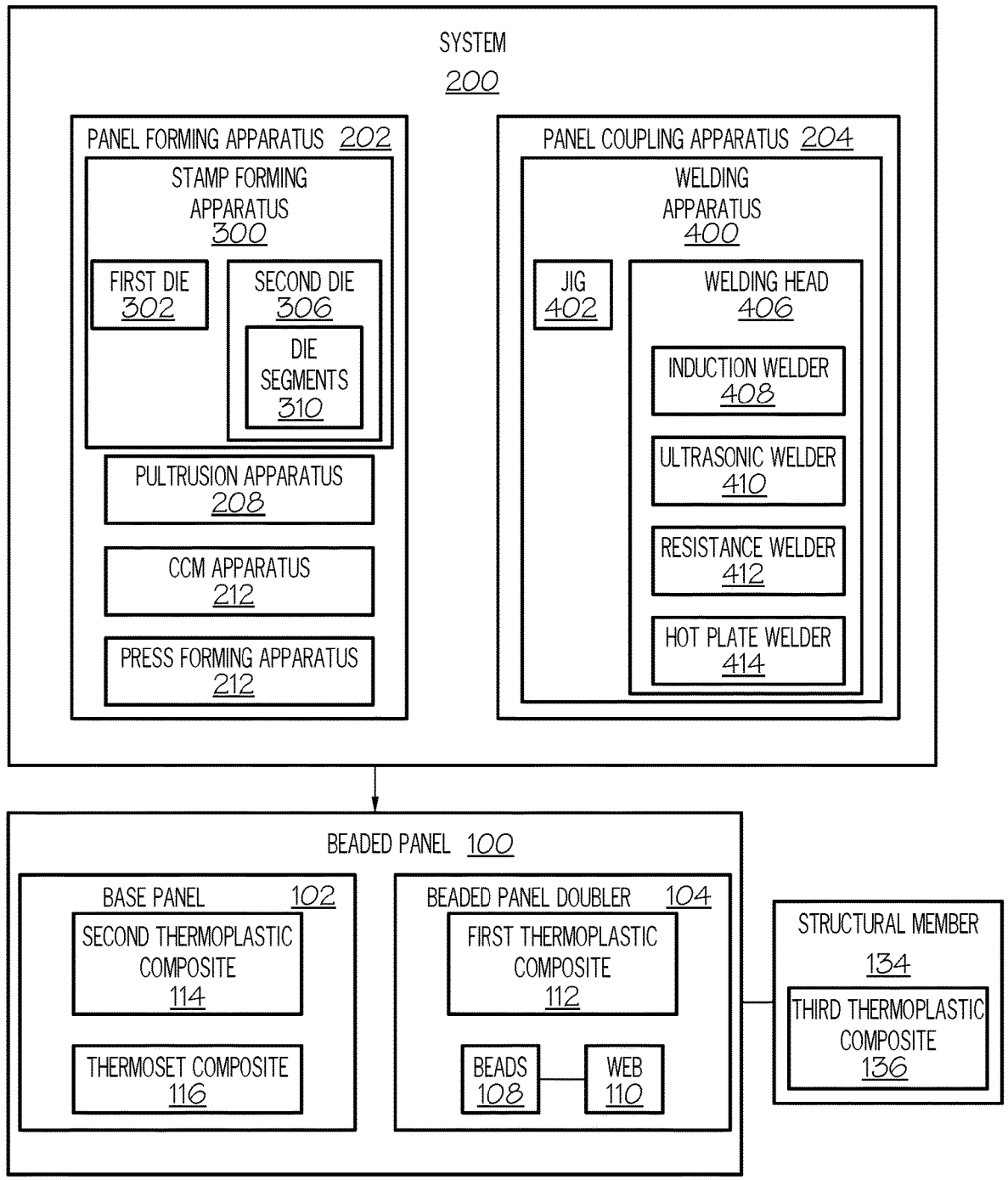
FIG. 1 is a schematic, block diagram of an example of a beaded panel and an example of a system for forming the beaded panel.

Referring generally to FIGS. 1-28, by way of examples, the present disclosure is directed to a beaded panel 100 and a system 200 for fabricating the beaded panel 100. The present disclosure is also directed to a stamp forming apparatus 300 for forming a beaded panel doubler 104. The present disclosure is further directed to a welding apparatus 400 for forming the beaded panel 100. The present disclosure is additionally directed to a structure 150 that includes the beaded panel 100.

Referring now to FIGS. 1-3, in one or more examples, beaded panel 100 includes a base panel 102 and a beaded panel doubler 104. The beaded panel doubler 104 is made of a first fiber-reinforced thermoplastic composite 112. The beaded panel doubler 104 is joined to the base panel 102. The beaded panel doubler 104 is configured to supplement a stiffness of the base panel 102.

The first fiber-reinforced thermoplastic composite 112 includes a fiber reinforcement material impregnated or infused with a thermoplastic polymer matrix material. In other words, the thermoplastic polymer matrix material is reinforced with fibers (e.g., reinforcing fibers). The fiber reinforcement material may include any one of various types of fiber, such as, but not limited to, carbon fiber, glass fiber, aramid fiber and the like. The fiber reinforcement material may take any one of various forms or configurations of fiber, such as continuous fibers, discontinuous fibers, woven fibers, braided fibers, unidirectional fibers, nonwoven fibers, non-crimped fibers and the like. The first fiber-reinforced thermoplastic composite 112 may include one or more layers or plies of fiber-reinforced thermoplastic material. Each one of the layers or plies may be formed from a composite fabric sheet of the fiber-reinforced thermoplastic material or runs of composite tape of the fiber-reinforced thermoplastic material. The fibers of each layer or ply may have any suitable fiber orientation. The thermoplastic polymer matrix material may include any one of various suitable thermoplastic polymers, such as, but not limited to, polyether ether ketone (PEEK), polyetherketoneketone (PEKK), polyaryletherketone (PAEK), polypropylene (PP), polyethylene (PE), polyvinylchloride (PVC) and the like.

Generally, the first fiber-reinforced thermoplastic composite 112 becomes pliable or moldable when heated above a specific temperature and hardens upon cooling. As such, the first fiber-reinforced thermoplastic composite 112 can be molded, melted, and remolded without altering its physical properties. The first fiber-reinforced thermoplastic composite 112 provides the beaded panel doubler 104 with relatively low density, relatively high strength, and very good impact resistance and damage tolerance.

Referring to FIG. 1, in one or more examples, the base panel 102 is made of a second fiber-reinforced thermoplastic composite 114. The second fiber-reinforced thermoplastic composite 114 includes a fiber reinforcement material impregnated or infused with a thermoplastic polymer matrix material. The second fiber-reinforced thermoplastic composite 114 provides the base panel 102 with relatively low density, relatively high strength, and very good impact resistance and damage tolerance.

Generally, the second fiber-reinforced thermoplastic composite 114 of the base panel 102 is compatible with the first fiber-reinforced thermoplastic composite 112 of the beaded panel doubler 104. In one or more examples, the thermoplastic polymer matrix material of the second fiber-reinforced thermoplastic composite 114 and the thermoplastic polymer matrix material of the first fiber-reinforced thermoplastic composite 112 are compatible with each other (e.g., are substantially the same thermoplastic polymer matrix material). In one or more examples, the second fiber-reinforced thermoplastic composite 114 of the base panel 102 and the first fiber-reinforced thermoplastic composite 112 of the beaded panel doubler 104 are substantially the same (e.g., include substantially the same fiber reinforcement material and the same thermoplastic polymer matrix material).

In one or more examples, the matrix materials used for the beaded panel doubler 104 and the base panel 102 are compatible but are not the same. In one or more examples, each one of the beaded panel doubler 104 and the base panel 102 is a composite laminate, in which the laminates have a chemically compatible thermoplastic surface layer that is the same on mating surfaces of both the beaded panel doubler 104 and the base panel 102.

Figure 28:
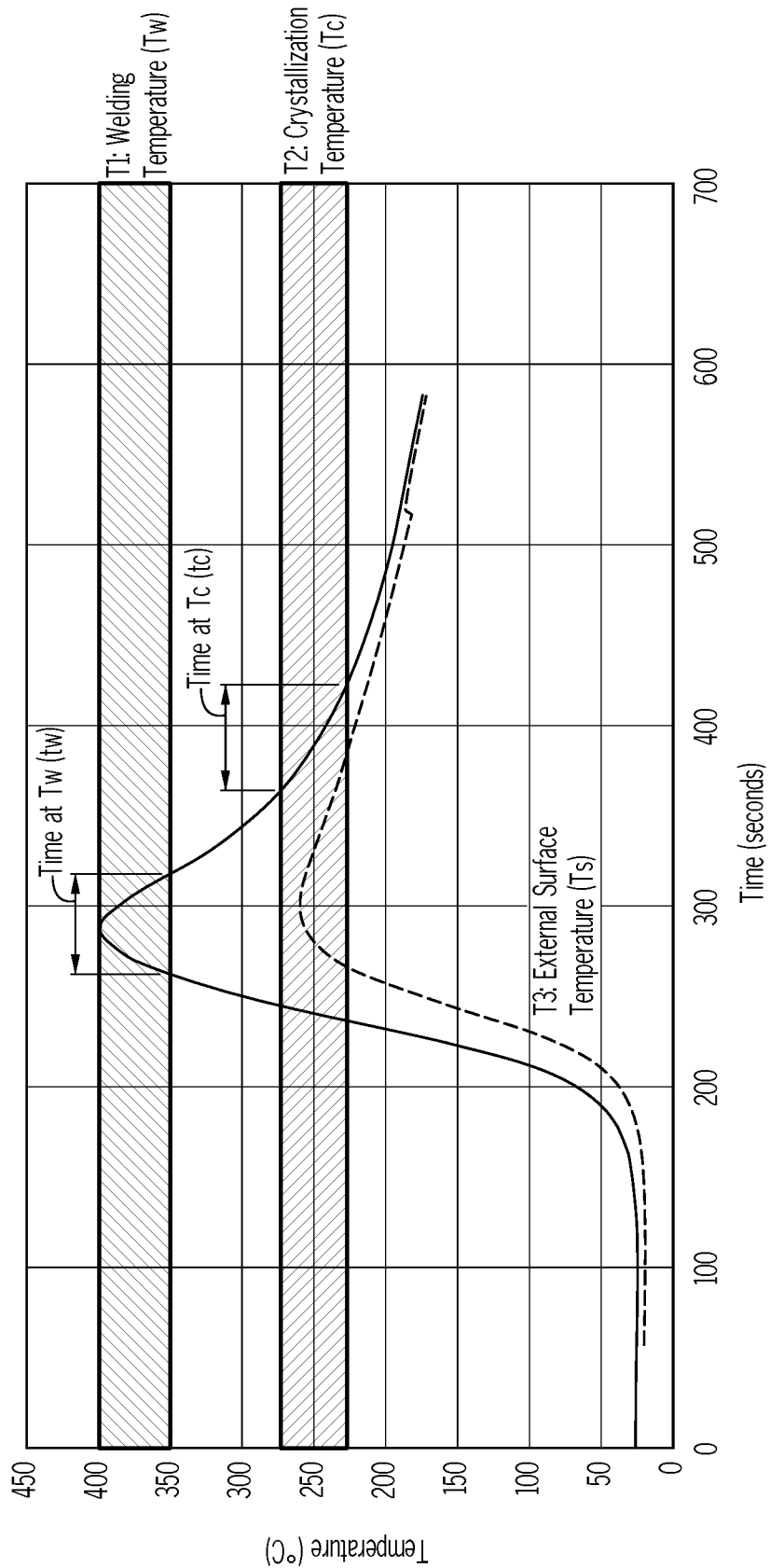
FIG. 28 is an illustration of a temperature profile of a thermoplastic welding operation for joining the beaded panel doubler and the base panel together.

In one or more examples, the beaded panel doubler 104 is joined to the base panel 102 by thermoplastic welding. Thermoplastic welding is a process used for joining thermoplastic composite parts using heating, pressure, and cooling. Generally, to begin a weld, a surface of the thermoplastic material is heated to its melting point, or thermoplastic state. Each thermoplastic material has its own thermoplastic state, which usually ranges between 250° C. (480° F.) and 500° C. (1022° F.), such as between 175° C. (350° F.) and 200° C. (400° F.) (e.g., as shown in FIG. 28). The thermoplastic material is then pressed together until it cools. The pressure applied allows molecules in the thermoplastic material to newly position themselves or to bond with molecules of another part.

In one or more examples, at least a portion of a surface of the base panel 102 and at least a portion of a surface of the beaded panel doubler 104 are heated to their respective melting points or thermoplastic states. At least the portion of the surface of the base panel 102 and at least the portion of the surface of the beaded panel doubler 104 are pressed and held together until each one cools. Upon cooling, the portion of the surface of the base panel 102 and the portion of the surface of the beaded panel doubler 104 are co-consolidated together.

The present disclosure recognizes that thermoplastic welding is a preferred technique for joining the base panel 102, made of the second fiber-reinforced thermoplastic composite 114, and the beaded panel doubler 104, made of the first fiber-reinforced thermoplastic composite 112. Thermoplastic welding advantageously provides several benefits, such as, but not limited to, high strength, design flexibility, low processing costs, and good fatigue properties. However, the present disclosure is not intended to be limited only to thermoplastic welding for joining thermoplastic components and other techniques for joining thermoplastic components are also contemplated.

In one or more examples, base panel 102 and the beaded panel doubler 104 are joined by a film joining technique. Film joining is a combination of welding and co-consolidating a lower-melt-temperature welding film on mating surfaces of parts to be joined. A welding step heats up the parts above the melt temperature of the welding film, but below the melt temperature of the part laminate matrix material, so the film surfaces are welded together.

In one or more examples, the base panel 102 is made of a fiber-reinforced thermoset composite 116. The fiber-reinforced thermoset composite 116 includes a fiber reinforcement material impregnated or infused with a thermoset polymer matrix material. In other words, the thermoset polymer matrix material is reinforced with fibers (reinforcing fibers). The fiber reinforcement material may include any one of various types of fiber, such as, but not limited to, carbon fiber, glass fiber, aramid fiber and the like. The fiber reinforcement material may take any one of various forms or configurations of fiber, such as continuous fibers, discontinuous fibers, woven fibers, braided fibers, unidirectional fibers, nonwoven fibers, non-crimped fibers and the like. The fiber-reinforced thermoset composite 116 may include one or more layers or plies of fiber-reinforced thermoset material. Each one of the layers or plies may be formed from a sheet of the fiber-reinforced thermoset material or runs of tape of the fiber-reinforced thermoset material. The fibers of each layer or ply may have any suitable fiber orientation. The thermoset polymer matrix material may include any one of various suitable thermoset polymers, such as, but not limited to, epoxy, resin, polyester, vinyl ester, polyurethane, polyamide, polyamide-imide and the like.

Generally, the fiber-reinforced thermoset composite 116 is cured, for example, via application of heat and/or pressure, into a solid form. As such, the fiber-reinforced thermoset composite 116 cannot return to its original uncured form. The fiber-reinforced thermoset composite 116 provides the base panel 102 with relatively high strength and very good fatigue strength.

In one or more examples, the beaded panel doubler 104 is joined to the base panel 102 by adhesive bonding. Adhesive bonding is a process used for joining (e.g., fastening) cured composite parts using an adhesive material, such as glue. Generally, the adhesive material is applied to a surface of one or both parts to form an adhesive bond between the surfaces.

In one or more examples, the beaded panel doubler 104 is joined to the base panel 102 by secondary bonding. Secondary bonding is a process for joining pre-cured (e.g., thermoset) or co-consolidated (e.g., thermoplastic) composite parts using adhesive bonding, during which the only chemical or thermal reaction that occurs is the curing of the adhesive material. Examples of the adhesive material include epoxy, various plastic agents, epoxy film adhesives, and the like that bond by evaporation of a solvent or by curing a bonding agent with heat, pressure, ultraviolet light, and/or time.

In one or more examples, the beaded panel doubler 104 is joined to the base panel 102 by co-bonding. Co-bonding is a process for joining composite parts in which a cured or consolidated composite is laid up against an uncured or a partially cured (e.g., green) composite with an adhesive, such as a film of adhesive resin, at an interface. The uncured or partially cured composite and the adhesive are co-cured using heat and/or pressure.

In one or more examples, beaded panel doubler 104 made of the first fiber-reinforced thermoplastic composite 112 and the base panel 102 made of the fiber-reinforced thermoset composite 116 are joined using mechanical fasteners.

Figure 4:
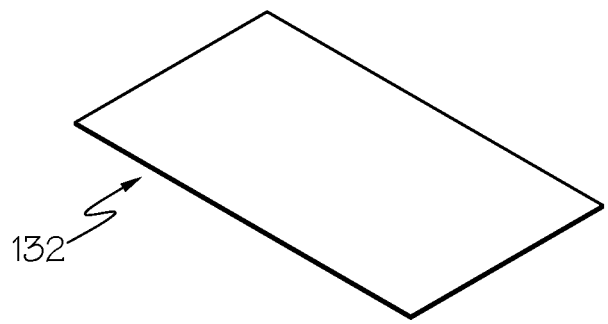
FIG. 4 is a schematic, perspective view of an example of a blank used to form a beaded panel doubler.
Figure 5:
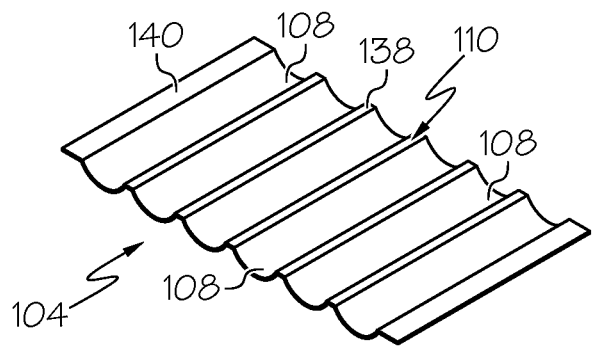
FIG. 5 is a schematic, perspective view of an example of a beaded panel doubler formed from the blank, shown in FIG. 4.
Figure 6:
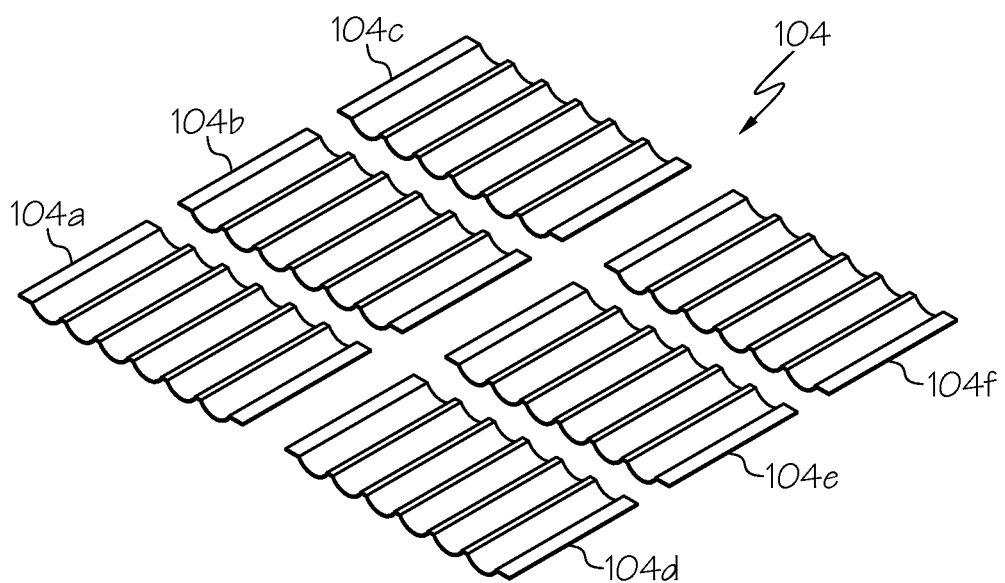
FIG. 6 is a schematic, perspective view of an example of a plurality of beaded panel doublers.

Referring now to FIGS. 4-6, in one or more examples, the beaded panel doubler 104 (e.g., as shown in FIG. 5) is formed from a blank 132 (e.g., as shown in FIG. 4). The blank 132 may also be referred to as a thermoplastic blank and is made of the first fiber-reinforced thermoplastic composite 112 (e.g., is a sheet or panel of fiber-reinforced thermoplastic material). As described above, the first fiber-reinforced thermoplastic composite 112 of the blank 132 may include one or more layers or plies of composite fabric sheets or runs of composite tape.

The beaded panel doubler 104 is formed by any one of various forming techniques. As an example, the blank 132 (e.g., plies of a fiber-reinforced thermoplastic composite material that are at least partially co-consolidated) is formed into the beaded panel doubler 104 by stamp forming. As other examples, plies of a fiber-reinforced thermoplastic composite material are co-consolidated to form the beaded panel doubler 104 by pultrusion, continuous compression molding, or press forming.

The forming technique selected may depend on various factors, such as, the material composition of the first fiber-reinforced thermoplastic composite 112, a thickness of the blank 132, a geometry of the beaded panel doubler 104 formed from the blank 132, the configuration of the first fiber-reinforced thermoplastic composite 112 (e.g., composite fabric sheets vs composite tape), and the like. Examples of the forming techniques include, but are not limited to, stamp forming, pultrusion, continuous compression molding, press forming, and the like.

The blank 132 (e.g., as shown in FIG. 4) forms a base structure for the beaded panel doubler 104 (e.g., as shown in FIG. 5). The blank 132 is generally planar or flat. The blank 132 may be referred to as a "thin" sheet of fiber-reinforced thermoplastic material having a thickness that is a small fraction of its length and width. The blank 132 may be rectangular (e.g., as shown in FIG. 4) or may have other geometries. The blank 132 may have a uniform thickness along its length and/or width or may have a varying thickness.

The beaded panel doubler 104 (e.g., as shown in FIG. 5) includes beads 108 and a web 110. The web 110 interconnects the beads 108. The beads 108 and the web 110 are formed in the blank 132 during the forming process. Generally, a bead 108 is an alteration to a cross-sectional shape of the blank 132 that supplement rigidity or stiffness of the base structure of the blank 132. Generally, the web 110 is formed by a portion of the blank 132 with an unaltered cross-section. In one or more examples, the web 110 is planar or flat. The web 110 is situated around (e.g., surrounds at least a portion of) and extends from (e.g., at least a portion of) a perimeter of each one of the beads 108. As an example, a connecting portion 138 of the web 110 extends between lengthwise edges of directly adjacent ones of the beads 108. As another example, an end portion of the web 110 extends from the lengthwise edge of an end one of the beads 108. As another example, an end portion of the web 110 extends from a widthwise edge of at least one of the beads 108. The beads 108 may be arranged in an array. A number, size, geometry, and/or orientation of the beads 108 may be specified to provide a desired stiffness.

Referring now to FIG. 6, in one or more examples, in one or more examples, a plurality of beaded panel doublers 104 may be formed from a plurality of blanks 132. Throughout the present disclosure, the plurality of beaded panel doublers 104 may be identified individually as a first beaded panel doubler 104a, a second beaded panel doubler 104b, a third beaded panel doubler 104c, a fourth beaded panel doubler 104d, a fifth beaded panel doubler 104e, a sixth beaded panel doubler 104f, etc. As illustrated in FIGS. 10, 11, 15 and 16, in one or more examples, the beaded panel 100 may include the plurality of beaded panel doublers 104, each of which is joined to the base panel 102.

Generally, each one of the beaded panel doublers 104 shares many common features with the others. As such, like numerals have, where possible, been used to denote like features, albeit with certain features having the addition of an alphabetic suffix (e.g., "a," "b," "c," etc.). Accordingly, unless explicitly stated otherwise, all of the beaded panel doublers 104 include substantially the same features and/or configurations.

Referring now to FIGS. 2 and 3, in one or more examples, at least a portion of the beaded panel doubler 104 (e.g., identified as the first beaded panel doubler 104a in FIGS. 2 and 3) is joined to the base panel 102. In one or more examples, at least a portion of the web 110 (e.g., identified as the first web 110a) of the beaded panel doubler 104 (e.g., the first beaded panel doubler 104a) is joined to the base panel 102.

Figure 10:
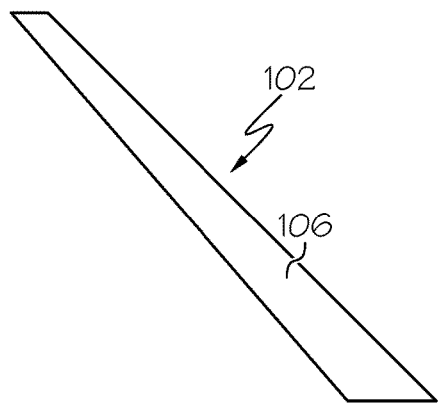
FIG. 10 is a schematic, perspective view of an example of a base panel.

In one or more examples, the base panel 102 includes a surface 106 (e.g., as also shown in FIG. 10). Generally, the surface 106 of the base panel 102 is one of the two opposing major surfaces or faces of the base panel 102. In one or more examples, at least a portion of the first web 110a of the first beaded panel doubler 104a is joined to the surface 106 of the base panel 102.

In one or more examples, the beaded panel doubler 104 includes a first surface 142 and a second surface 144 that is opposite the first surface 142. Generally, the first surface 142 and the second surface 144 of the beaded panel doubler 104 are the two opposing major surfaces or faces of the beaded panel doubler 104. In one or more examples, at least a portion of the first surface 142 of the first web 110a of the first beaded panel doubler 104a is joined to the surface 106 of the base panel 102. For example, the first surface 142 of the connecting portion 138 and the first surface 142 of the end portion 140 of the first web 110a is joined to the surface 106 of the base panel 102.

FIGS. 2 and 3 better illustrate how the beads 108 alter the cross-section of the base structure of the blank 132 (e.g., as shown in FIG. 4) when formed into the beaded panel doubler 104 (e.g., first beaded panel doubler 104a and second beaded panel doubler 104b shown in FIGS. 2 and 3). Generally, a portion of the first surface 142 (e.g., bottom surface or bottom side) and an opposing portion of the second surface 144 (e.g., top surface or top side) of the web 110 (e.g., first web 110a and second web 110b) of the beaded panel doubler 104 are planar or flat. A portion of the first surface 142 of the bead 108 (e.g., first bead 108a and second bead 108b) is concave and an opposing portion of the second surface 144 of the bead 108 is convex such that the bead 108 includes or forms a protrusion 118 (e.g., or bulge) that projects from a top side of the beaded panel doubler 104.

In other words, the cross-section of the beaded panel doubler 104 transitions from a plane of the web 110 to the protrusion 118 that is out of the plane of the web 110. The cross-section of the beaded panel doubler 104 having the out-of-plane transition can carry higher loads than a fiber-reinforced thermoplastic composite panel having a planar cross-section. As such, when the beaded panel doubler 104 is joined to the base panel 102, the resulting beaded panel 100 can carry higher loads than a laminate composite panel having a planar cross-section.

Referring again to FIGS. 1-3, in one or more examples, the beaded panel 100 also includes the second beaded panel doubler 104b. In one or more examples, at least a portion of the second beaded panel doubler 104b is joined to at least one of the base panel 102 and/or the beaded panel doubler 104.

In one or more examples, the second beaded panel doubler 104b is also made of the first fiber-reinforced thermoplastic composite 112. However, in other examples, the second beaded panel doubler 104b may be made of a fiber-reinforced thermoplastic composite that is different than the first fiber-reinforced thermoplastic composite 112.

In one or more examples, the second beaded panel doubler 104b includes the second beads 108b and the second web 110b. The second web 110b interconnects the second beads 108b. The second beaded panel doubler 104b includes the first surface 142 and the second surface 144, which are associated with the second web 110b and the protrusion 118 of each one of the second beads 108b, as described above.

As illustrated in FIG. 2, in one or more examples, the second beaded panel doubler 104b is joined to the first beaded panel doubler 104a and to the base panel 102. For example, at least a portion of the second web 110b of the second beaded panel doubler 104b is joined to at least a portion of the first web 110a of the first beaded panel doubler 104a. At least a portion of the second web 110b is also joined to the base panel 102.

In one or more examples, a portion of the first surface 142 of the second web 110b of the second beaded panel doubler 104b is joined to a portion of the second surface 144 of the first web 110a of the first beaded panel doubler 104a. A portion of the first surface 142 of the second web 110b of the second beaded panel doubler 104b is joined to the surface 106 of the base panel 102. For example, the first surface 142 of the end portion 140 of the second web 110b is joined to the second surface 144 of the end portion 140 of the first web 110a. The first surface 142 of the connecting portion 138 of the second web 110b is joined to the surface 106 of the base panel 102. In such examples, at least a portion of the second web 110b (e.g., at least a portion of the end portion 140 of the second web 110b) overlaps or is situated over at least a portion of the first web 110a (e.g., at least a portion of the end portion 140 of the first web 110a). In other words, the first web 110a and the second web 110b form a lap joint.

In one or more examples, such as examples in which the first beaded panel doubler 104a, the second beaded panel doubler 104b, and the base panel 102 are made of the fiber-reinforced thermoplastic composite, at least the portion of the second web 110b of the second beaded panel doubler 104b is joined to the first web 110a of the first beaded panel doubler 104a by thermoplastic welding and at least the portion of the second web 110b of the second beaded panel doubler 104b is joined to base panel 102 by thermoplastic welding.

In one or more examples, such as examples in which the first beaded panel doubler 104a and the second beaded panel doubler 104b are made of the fiber-reinforced thermoplastic composite and the base panel 102 is made of the fiber-reinforced thermoset composite, at least the portion of the second web 110b of the second beaded panel doubler 104b is joined to the first web 110a of the first beaded panel doubler 104a by thermoplastic welding and at least the portion of the second web 110b of the second beaded panel doubler 104b is joined to base panel 102 by one of adhesive bonding, secondary bonding, or co-bonding.

As illustrated in FIG. 3, in one or more examples, the second beaded panel doubler 104b is joined only to the base panel 102. For example, at least a portion of the second web 110b is joined to the base panel 102.

In one or more examples, a portion of the first surface 142 of the second web 110b of the second beaded panel doubler 104b is joined to the surface 106 of the base panel 102. For example, the first surface 142 of the connecting portion 138 and the first surface 142 of the end portion 140 of the second web 110b are joined to the surface 106 of the base panel 102. In such examples, a portion of the second web 110b (e.g., the end portion 140 of the second web 110b) abuts or is situated directly adjacent to a portion of the first web 110a (e.g., the end portion 140 of the first web 110a). In other words, the first web 110a and the second web 110b form a butt joint.

In one or more examples, such as examples in which the second beaded panel doubler 104b and the base panel 102 are made of the fiber-reinforced thermoplastic composite, at least the portion of the second web 110b of the second beaded panel doubler 104b is joined to base panel 102 by thermoplastic welding.

In one or more examples, such as examples in which the second beaded panel doubler 104b is made of the fiber-reinforced thermoplastic composite and the base panel 102 is made of the fiber-reinforced thermoset composite, at least the portion of the second web 110b of the second beaded panel doubler 104b is joined to base panel 102 by one of adhesive bonding, secondary bonding, or co-bonding.

Figure 7:
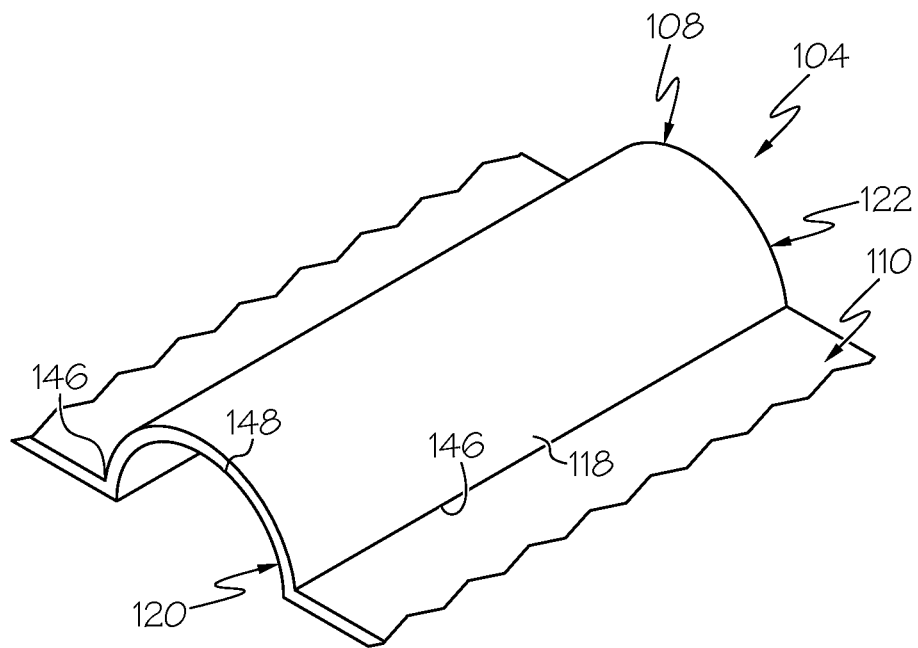
FIG. 7 is a schematic, perspective view of an example of a portion of the beaded panel doubler.
Figure 8:
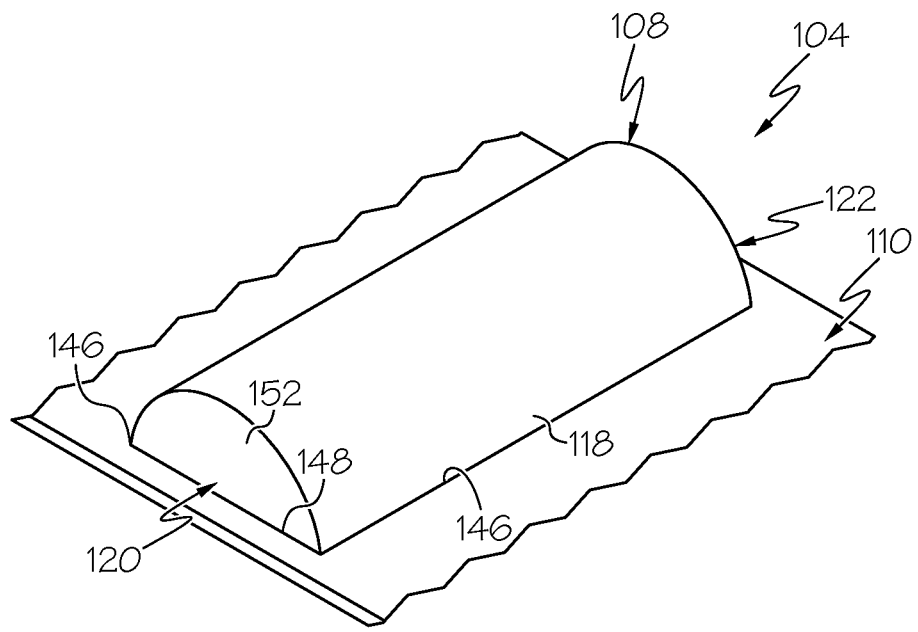
FIG. 8 is a schematic, perspective view of an example of a portion of the beaded panel doubler.

Referring now to FIGS. 7 and 8, in one or more examples, each one of the beads 108 includes or otherwise forms the protrusion 118 that projects out of the place of the web 110. The protrusion 118 includes a first end 120 and a second end 122 that is opposite the first end 120.

Referring to FIG. 7, in one or more examples, at least one of the first end 120 and the second end 122 of the bead 108 (e.g., the protrusion 118 formed by the bead 108) is open. For example, the first end 120 and the second end 122 of the bead 108 are open. This configuration may also be referred to as an "open bead." In one or more examples, a portion of the web 110 extends transversely (or laterally) outward from a lengthwise edge 146, which is formed along an intersection of a base of the protrusion 118 and the web 110 and does not extend longitudinally beyond the end of the lengthwise edge 146 (e.g., beyond a widthwise edge 148 of the protrusion 118). A recess or concavity on the bottom side of the beaded panel doubler 104, formed by the protrusion 118, is open at the ends of the protrusion 118.

Referring to FIG. 8, in one or more examples, at least one of the first end 120 and the second end 122 of the bead 108 (e.g., the protrusion 118 formed by the bead 108) is closed. For example, the first end 120 and the second end 122 of the bead 108 are closed. This configuration may also be referred to as a "closed bead." In one or more examples, a portion of the web 110 extends transversely (or laterally) outward from a lengthwise edge 146, which is formed along an intersection of a base of the protrusion 118 and the web 110 and also extends longitudinally beyond the end of the lengthwise edge 146 (e.g., form the widthwise edge 148 of the protrusion 118). A recess or concavity on the bottom side of the beaded panel doubler 104, formed by the protrusion 118, is closed at the ends of the protrusion 118. For example, an end portion 152 of the protrusion 118 extends from a curved upper portion of the widthwise edge 148 to a linear lower portion of the widthwise edge 148 at the intersection of the base of the protrusion 118 and the web 110.

The beads 108 may have any one of various geometries. Generally, the bead 108 is a continuous structure having an elongated profile in a direction of its longitudinal axis. In one or more examples, the geometry of the bead 108 may be constant along its longitudinal axis. For example, the bead 108 is symmetric about its longitudinal axis. In one or more examples, the geometry of the bead 108 may vary along its longitudinal axis. For example, a central section of the bead 108 may be narrower than end sections of the bead 108. As an example, the end sections of the bead 108 may flare outward such that the bead 108 resembles the shape of a bowtie. In one or more examples, the bead 108 may include one or more transition sections that transition the bead 108 from one cross-sectional shape to another along its longitudinal axis.

The beads 108 and the web 110 of the beaded panel doubler 104 may also have various dimensions, for example, depending on the application of the beaded panel 100. In one or more examples, the bead 108 has a height (e.g., measured from the surface 106 of the base panel 102 to an apex of the convex surface of the bead 108) of approximately between 0.5 inch (12 millimeters) and 2 inches (50 millimeters). In one or more examples, the end portion 140 of the web 110 may have a width of approximately 1 inch (25 millimeters). In one or more examples, the connecting portion 138 of the web 110 may have a width of approximately 0.5 inch (12 millimeters).

Figure 9:
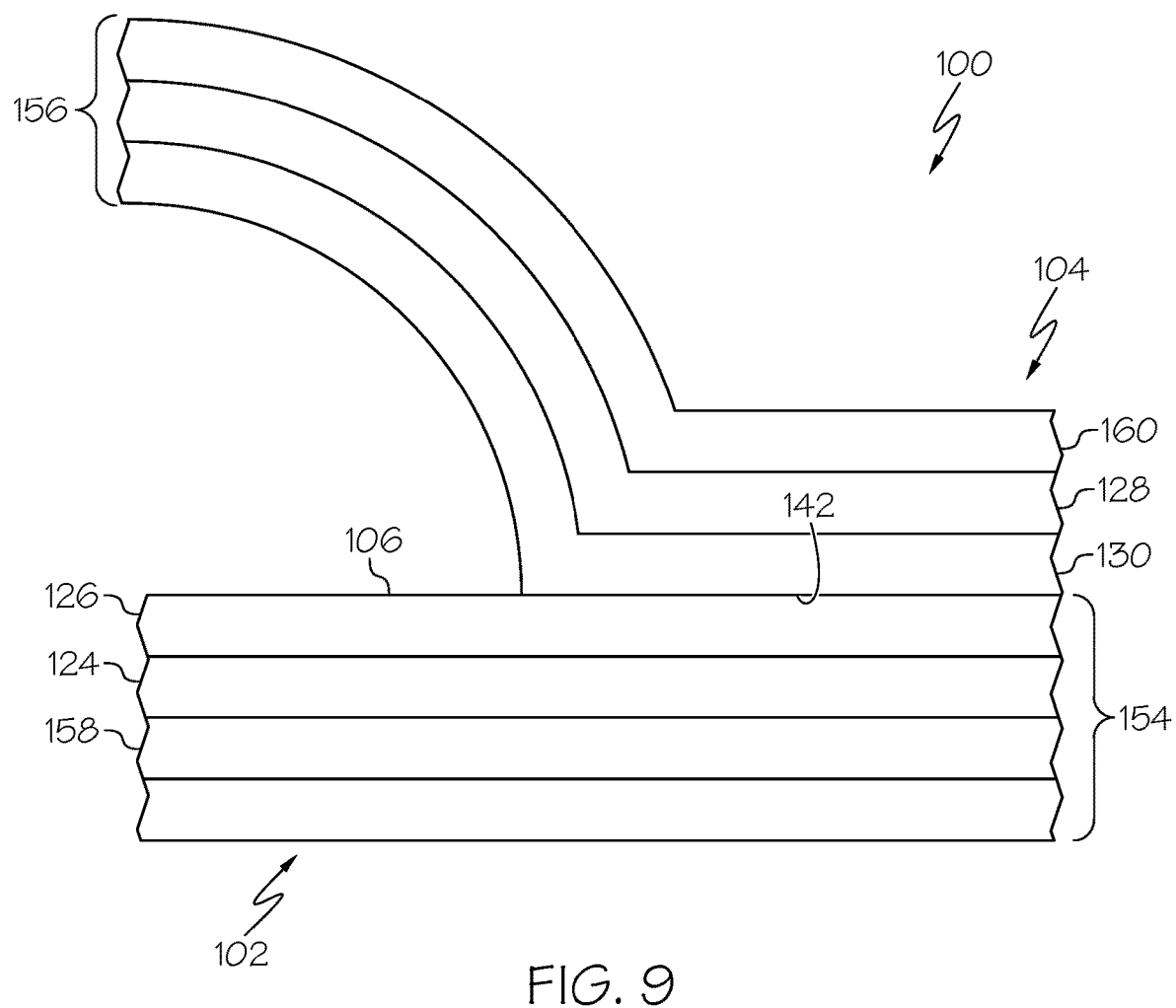
FIG. 9 is a schematic, elevation, sectional view of an example of a portion of the beaded panel.

Referring now to FIG. 9, in one or more examples, the base panel 102 is a composite laminate that includes a first plurality of fiber-reinforced thermoplastic composite layers 154 (e.g., the second fiber-reinforced thermoplastic composite 114) and the beaded panel doubler 104 is a composite laminate that includes a second plurality of fiber-reinforced thermoplastic composite layers 156 (e.g., the first fiber-reinforced thermoplastic composite 112). For example, the base panel 102 (e.g., the first plurality of fiber-reinforced thermoplastic composite layers 154) includes at least a first fiber-reinforced thermoplastic composite layer 124 and a second fiber-reinforced thermoplastic composite layer 126. Optionally, the base panel 102 (e.g., the first plurality of fiber-reinforced thermoplastic composite layers 154) may include an additional number of fiber-reinforced thermoplastic composite layers. The beaded panel doubler 104 (e.g., the second plurality of fiber-reinforced thermoplastic composite layers 156) includes at least a third fiber-reinforced thermoplastic composite layer 128 and a fourth fiber-reinforced thermoplastic composite layer 130. Optionally, the beaded panel doubler 104 (e.g., the second plurality of fiber-reinforced thermoplastic composite layers 156) may include an additional number of fiber-reinforced thermoplastic composite layers.

Generally, each one of the first plurality of fiber-reinforced thermoplastic composite layers 154 of the base panel 102 has a melting temperature or thermoplastic state temperature. Similarly, each one of the second plurality of fiber-reinforced thermoplastic composite layers 156 of the beaded panel doubler 104 has a melting temperature or thermoplastic state temperature. The melting temperatures or thermoplastic state temperatures may depend on the thermoplastic matrix material of the fiber-reinforced thermoplastic composite material used to form the base panel 102 and the beaded panel doubler 104.

In one or more examples, an outermost one (e.g., second fiber-reinforced thermoplastic composite layer 126) of the first plurality of fiber-reinforced thermoplastic composite layers 154 of the base panel 102 and/or an outermost one (e.g., fourth fiber-reinforced thermoplastic composite layer 130) of the second plurality of fiber-reinforced thermoplastic composite layers 156 of the beaded panel doubler 104, having the lower melting temperature, may not include a fiber reinforcement. In one or more examples, an outermost one (e.g., second fiber-reinforced thermoplastic composite layer 126) of the first plurality of fiber-reinforced thermoplastic composite layers 154 of the base panel 102 and/or an outermost one (e.g., fourth fiber-reinforced thermoplastic composite layer 130) of the second plurality of fiber-reinforced thermoplastic composite layers 156 of the beaded panel doubler 104, having the lower melting temperature, may be substantially thinner than the other first plurality of fiber-reinforced thermoplastic composite layers 154 and/or second plurality of fiber-reinforced thermoplastic composite layers 156, respectively. For example, the outermost one (e.g., second fiber-reinforced thermoplastic composite layer 126) of the first plurality of fiber-reinforced thermoplastic composite layers 154 of the base panel 102 and/or the outermost one (e.g., fourth fiber-reinforced thermoplastic composite layer 130) of the second plurality of fiber-reinforced thermoplastic composite layers 156 of the beaded panel doubler 104, having the lower melting temperature, may be a film (e.g., the welding film described herein above).

In one or more examples, the melting temperature of at least one of the first plurality of fiber-reinforced thermoplastic composite layers 154 of the base panel 102 is different than the melting temperature of at least another one of the first plurality of fiber-reinforced thermoplastic composite layers 154 of the base panel 102. For example, the melting temperature of at least one of the first plurality of fiber-reinforced thermoplastic composite layers 154 of the base panel 102 is less than at least another one of the first plurality of fiber-reinforced thermoplastic composite layers 154 of the base panel 102. In one or more examples, the melting temperature of at least an outermost one of the first plurality of fiber-reinforced thermoplastic composite layers 154 that forms a joining surface of the base panel 102 is less than the other ones of the first plurality of fiber-reinforced thermoplastic composite layers 154 of the base panel 102.

In one or more examples, the melting temperature of at least one of the second plurality of fiber-reinforced thermoplastic composite layers 156 of the beaded panel doubler 104 is different than the melting temperature of at least another one of the second plurality of fiber-reinforced thermoplastic composite layers 156 of the beaded panel doubler 104. For example, the melting temperature of at least one of the second plurality of fiber-reinforced thermoplastic composite layers 156 of the beaded panel doubler 104 is less than the melting temperature of at least another one of the second plurality of fiber-reinforced thermoplastic composite layers 156 of the beaded panel doubler 104. In one or more examples, the melting temperature of at least an outermost one of the second plurality of fiber-reinforced thermoplastic composite layers 156 that forms a joining surface of the beaded panel doubler 104 is less than the other ones of the second plurality of fiber-reinforced thermoplastic composite layers 156 of the beaded panel doubler 104.

In one or more examples, the first fiber-reinforced thermoplastic composite layer 124 of the base panel 102 has a first melting temperature. The second fiber-reinforced thermoplastic composite layer 126 has a second melting temperature. The third fiber-reinforced thermoplastic composite layer 128 has a third melting temperature. The fourth fiber-reinforced thermoplastic composite layer 130 has a fourth melting temperature. In one or more examples, the second melting temperature and the fourth melting temperature are approximately the same.

In one or more examples, the second melting temperature of the second fiber-reinforced thermoplastic composite layer 126 is less than the first melting temperature of the first fiber-reinforced thermoplastic composite layer 124. The fourth melting temperature of the fourth fiber-reinforced thermoplastic composite layer 130 is less than the third melting temperature of the third fiber-reinforced thermoplastic composite layer 128.

In one or more examples, the second fiber-reinforced thermoplastic composite layer 126 is situated in an outermost (e.g., top) position such that the second fiber-reinforced thermoplastic composite layer 126 forms the surface 106 of the base panel 102. Similarly, the fourth fiber-reinforced thermoplastic composite layer 130 is situated in an outermost (e.g., bottom) position such that the fourth fiber-reinforced thermoplastic composite layer 130 forms the first surface 142 of the beaded panel doubler 104.

Accordingly, during thermoplastic welding of the beaded panel doubler 104 to the base panel 102, the beaded panel doubler 104 and the base panel 102 are heated to a temperature that is greater than the second melting temperature and the fourth melting temperature but that is less than the first melting temperature and the third melting temperature to thermally weld the second fiber-reinforced thermoplastic composite layer 126 and the fourth fiber-reinforced thermoplastic composite layer 130 together without melting the first fiber-reinforced thermoplastic composite layer 124 and the third fiber-reinforced thermoplastic composite layer 128 (and any other fiber-reinforced thermoplastic composite layers of the base panel 102 or the beaded panel doubler 104). As such, the base panel 102 and the beaded panel doubler 104 may better maintain their respective shapes during thermoplastic welding.

In one or more examples, the fiber-reinforced thermoplastic composite layers having the higher melting point (e.g., first fiber-reinforced thermoplastic composite layer 124 and third fiber-reinforced thermoplastic composite layer 128) include the thermoplastic matrix material of polyether ether ketone (PEEK) or polyetherketoneketone (PEKK). In one or more examples, the fiber-reinforced thermoplastic composite layers having the lower melting point (e.g., second fiber-reinforced thermoplastic composite layer 126 and fourth fiber-reinforced thermoplastic composite layer 130) include the thermoplastic matrix material of low melt polyaryletherketone (LM PAEK).

In one or more examples, the difference between the higher melting temperature and the lower melting temperature ranges from approximately 75° C. (170° F.) to 120° C. (250° F.), such as from 2° C. (35° F.) to 38° C. (100° F.). In one or more examples, the fiber-reinforced thermoplastic composite layers having the higher melting point (e.g., first fiber-reinforced thermoplastic composite layer 124 and third fiber-reinforced thermoplastic composite layer 128) has a melting temperature between approximately 375° C. (700° F.) and 410° C. (770° F.). In one or more examples, the fiber-reinforced thermoplastic composite layers having the lower melting point (e.g., second fiber-reinforced thermoplastic composite layer 126 and fourth fiber-reinforced thermoplastic composite layer 130) has a melting temperature between approximately 275° C. (530° F.) and 357° C. (675° F.).

The illustrated example depicts the base panel 102 and the beaded panel doubler 104 as each having only one outermost fiber-reinforced thermoplastic composite layer with a lower melting temperature (e.g., the second fiber-reinforced thermoplastic composite layer 126 and the fourth fiber-reinforced thermoplastic composite layer 130, respectively). However, in other examples, the base panel 102 and/or the beaded panel doubler 104 may have more than one fiber-reinforced thermoplastic composite layer with a lower melting temperature (e.g., the second fiber-reinforced thermoplastic composite layer 126 and the first fiber-reinforced thermoplastic composite layer 124 of the base panel 102 and/or the fourth fiber-reinforced thermoplastic composite layer 130 and the third fiber-reinforced thermoplastic composite layer 128 of the beaded panel doubler 104). In such examples, the remaining fiber-reinforced thermoplastic composite layers of the base panel 102 and/or the beaded panel doubler 104 (e.g., fifth fiber-reinforced thermoplastic composite layer 158 of the base panel 102 and/or sixth fiber-reinforced thermoplastic composite layer 160 of the beaded panel doubler 104) have a higher melting temperature.

In other examples, the melting temperature of all of the first plurality of fiber-reinforced thermoplastic composite layers 154 of the base panel 102 are the same. In other examples, the melting temperature of all of the second plurality of fiber-reinforced thermoplastic composite layers 156 of the beaded panel doubler 104 are the same. In one or more examples, the melting temperature of the first plurality of fiber-reinforced thermoplastic composite layers 154 of the base panel 102 and the melting temperature of the second plurality of fiber-reinforced thermoplastic composite layers 156 of the beaded panel doubler 104 are the same.

Referring again to FIG. 1, in one or more examples, the system 200 includes a panel forming apparatus 202. The panel forming apparatus 202 is configured to form the beaded panel doubler 104. For example, the panel forming apparatus 202 forms the beaded panel doubler 104 from the blank 132 (e.g., as shown in FIG. 4). The beaded panel doubler 104 is made of the first fiber-reinforced thermoplastic composite 112. The beaded panel doubler 104 includes the beads 108 and the web 110 that interconnects the beads 108.

The panel forming apparatus 202 may include or take the form of any one of various types of forming apparatuses using any one of various forming techniques. The type of forming apparatus and/or the forming technique may depend on various factors, such as, but not limited to, the type of fiber-reinforced thermoplastic composite material used to form the beaded panel doubler 104 (e.g., composite fabric vs. composite tape).

In one or more examples, the panel forming apparatus 202 includes or takes the form of the stamp forming apparatus 300.

In one or more examples, stamp forming facilitates unique shapes for each bead 108 of the beaded panel doubler 104 and variable cross-sections within a bead 108. In one or more examples, stamp forming also enables formation of open beads (e.g., as shown in FIG. 7) and closed beads (e.g., as shown in FIG. 8). In one or more examples, stamp forming facilitates forming the web 110 having a double curvature. Additionally, stamp forming is a relatively fast process (e.g., minutes) compared to autoclave consolidation.

In one or more examples, the panel forming apparatus 202 includes or takes the form of a pultrusion apparatus 208.

In one or more examples, the panel forming apparatus 202 includes or takes the form of a continuous compression molding ("CCM") apparatus 210.

In one or more examples, continuous compression molding is an efficient way of making the beaded panel doubler 104 having a constant cross section. For example, many beaded panel doublers 104 having substantially similar shapes can be made as one elongated beaded panel doubler 104 and then trimmed to several smaller beaded panel doublers 104.

In one or more examples, the panel forming apparatus 202 includes or takes the form of a press forming apparatus 212.

In one or more examples, press forming is less limited by size than, for example, stamp forming or continuous compression molding. Additionally, press forming does not have the same geometric restrictions of continuous compression molding. For example, press forming can also be used to consolidate the base panel 102 (e.g., either flat or curved).

The system 200 also includes a panel joining apparatus 204. The panel joining apparatus 204 is configured to join at least a portion of the beaded panel doubler 104 to the base panel 102. For examples, the panel joining apparatus 204 is configured to join at least a portion of the web 110 of the beaded panel doubler 104 to the base panel 102.

In one or more examples, the panel joining apparatus 204 includes the welding apparatus 400. The welding apparatus 400 is configured to join at least the portion of the beaded panel doubler 104 and the base panel 102 together by thermoplastic welding. For example, the welding apparatus 400 is configured to join at least the portion of the web 110 of the beaded panel doubler 104 and the base panel 102 together by thermoplastic welding.

In other examples, the panel joining apparatus 204 may include another type of joining apparatus or machine that is configured to join at least the portion of the beaded panel doubler 104 and the base panel 102 together, for example, by one of adhesive bonding, secondary bonding, or co-bonding.

Figure 11:
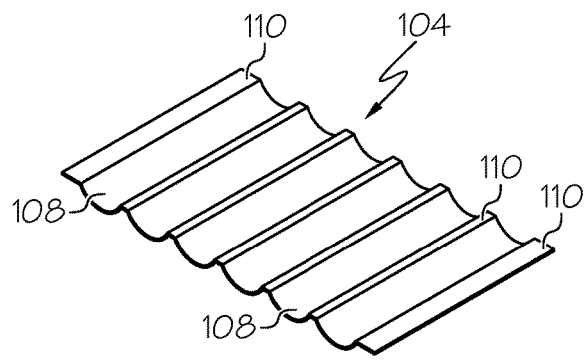
FIG. 11 is a schematic, perspective view of an example of the beaded panel doubler to be joined to the base panel, shown in FIG. 10.
Figure 12:
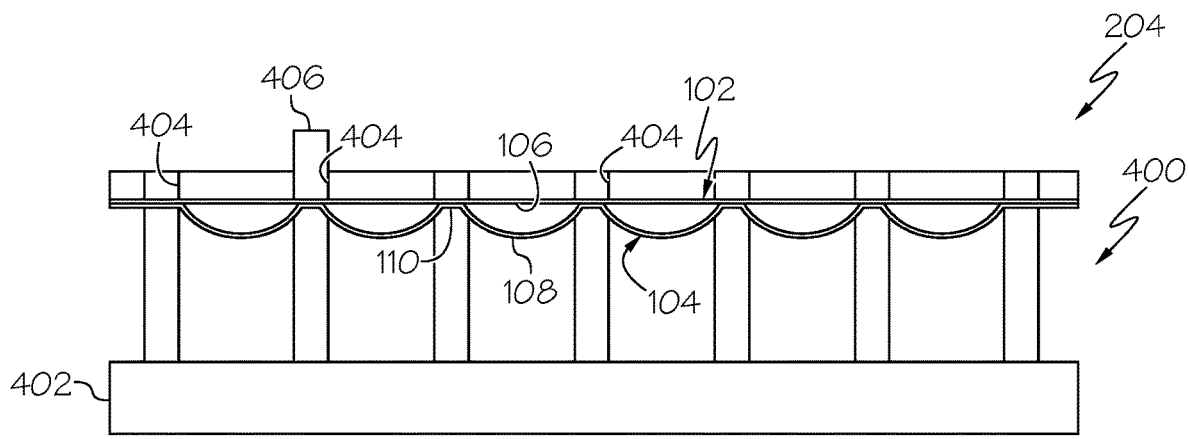
FIG. 12 is a schematic, elevation, sectional view of an example of a panel joining apparatus for joining the beaded panel doubler, shown in FIG. 11, and the base panel, shown in FIG. 10.

Referring now to FIG. 10-12, which illustrate examples of the base panel 102, the beaded panel doubler 104, and the panel joining apparatus 204. In one or more examples, the panel joining apparatus 204 includes a jig 402. The jig 402 is configured to hold the base panel 102 and the beaded panel doubler 104 in a proper or desired position relative to each other for joining. For example, the jig 402 holds the beaded panel doubler 104 against the base panel 102 such that the first surface 142 of the web 110 is in contact with the surface 106 of the base panel 102.

In one or more examples, the jig 402 is configured to compress or clamp the base panel 102 and the beaded panel doubler 104 together or otherwise apply pressure to the base panel 102 and the beaded panel doubler 104 during the joining operation.

In one or more examples, such as examples in which the panel joining apparatus 204 includes the welding apparatus 400, the jig 402 is configured to permit access to the base panel 102 by a welding head 406 that is configured to thermally weld the beaded panel doubler 104 and the base panel 102 together.

Figure 13:
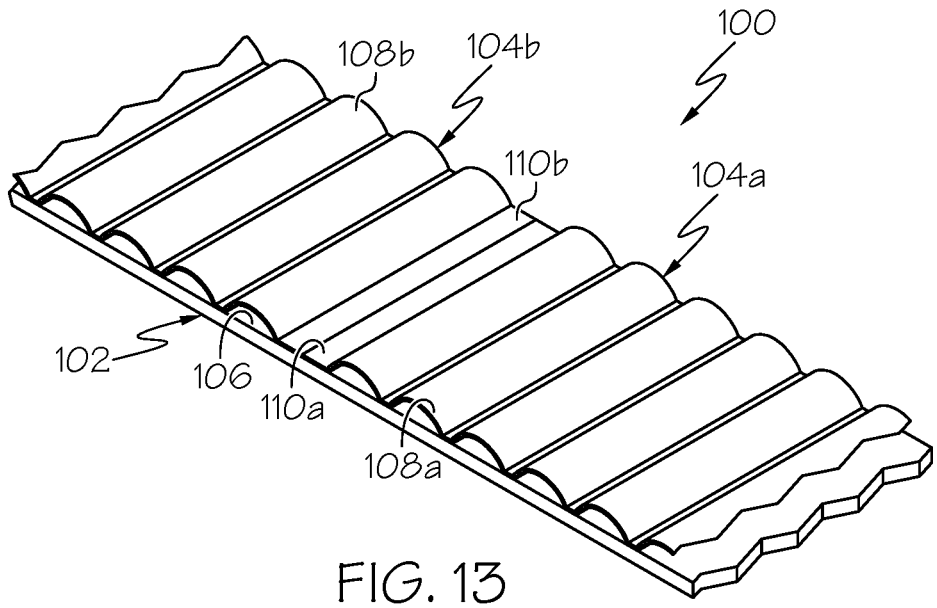
FIG. 13 is a schematic, perspective view of a portion of an example of the beaded panel.

FIG. 13 illustrates an example of a portion of the beaded panel 100. The beaded panel 100 includes the base panel 102 and two beaded panel doublers 104 (e.g., first beaded panel doubler 104a and second beaded panel doubler 104b) joined to the base panel 102. In one or more examples, the beaded panel doublers 104 are joined to the base panel 102 such that the beads 108 extend laterally across the base panel 102

(e.g., transverse a longitudinal axis of the base panel 102 or otherwise extend in a widthwise direction). Generally, the beaded panel doublers 104 increase the stiffness of the base panel 102.

Figure 14:
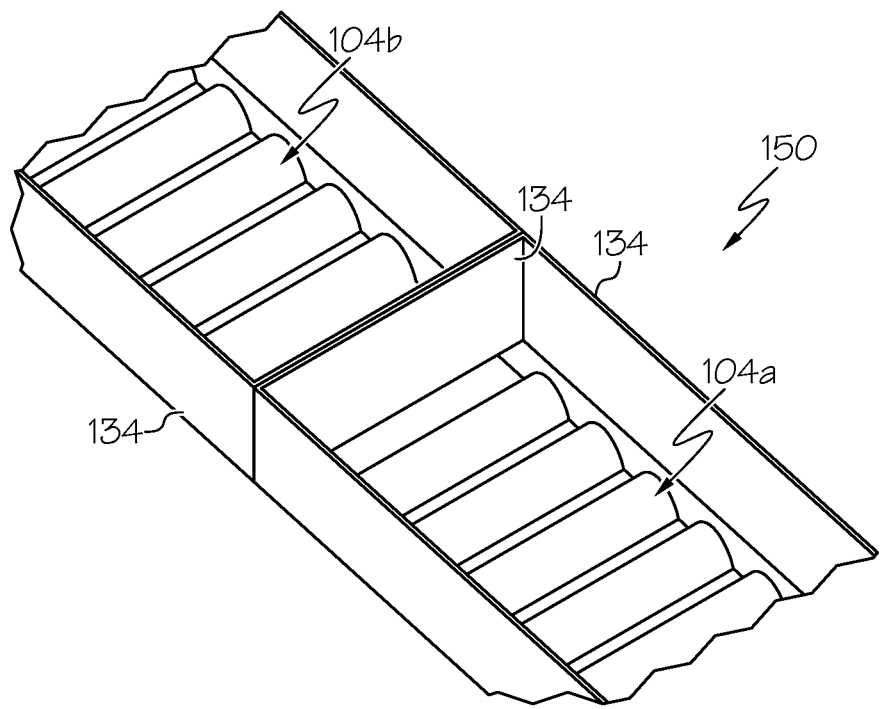
FIG. 14 is a schematic, perspective view of a portion of an example of a structure that includes the beaded panel, shown in FIG. 13.

FIG. 14 illustrates an example of the structure 150 that includes the beaded panel 100. In one or more examples, the structure 150 includes at least one structural member 134 that is coupled to beaded panel 100. The structural member 134 may be coupled to the beaded panel 100 in any one of various ways.

In one or more examples, the structural member 134 is made of a third fiber-reinforced thermoplastic composite 136 (e.g., as shown in FIG. 1). The third fiber-reinforced thermoplastic composite 136 includes a fiber reinforcement material impregnated or infused with a thermoplastic polymer matrix material. The third fiber-reinforced thermoplastic composite 136 provides the structural member 134 with relatively low density, relatively high strength, and very good impact resistance and damage tolerance.

In one or more examples, the structural member 134, made of the third fiber-reinforced thermoplastic composite 136, is joined to the beaded panel 100 by thermoplastic welding. However, in other examples, the structural member 134 may be joined to the beaded panel 100 in any one of various other ways, such as, but not limited to, adhesive bonding, secondary bonding, co-bonding, using mechanical fasteners, and the like.

Figure 15:
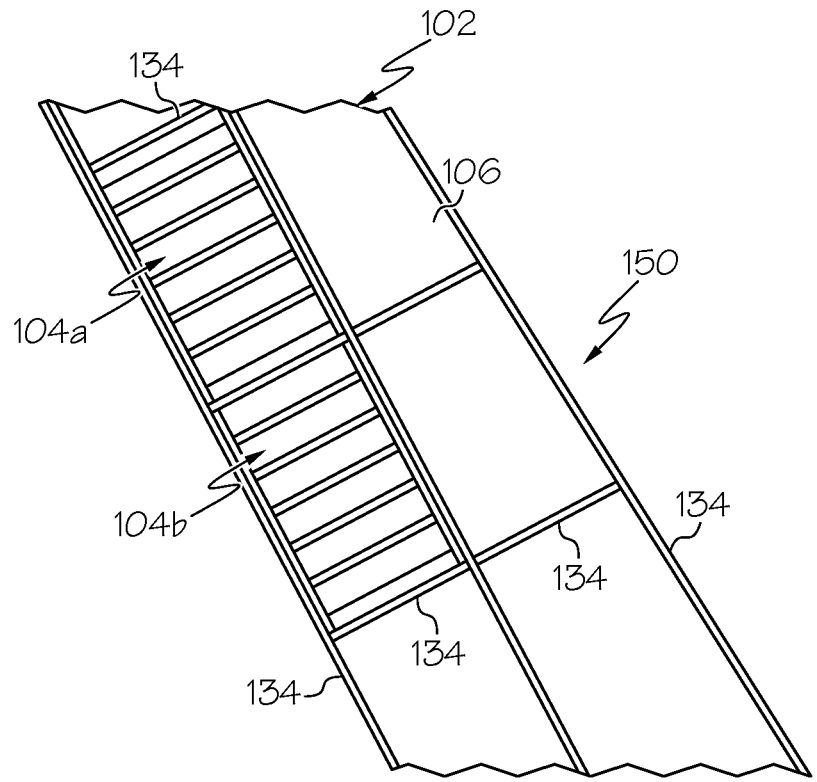
FIG. 15 is a schematic, perspective view of a portion of an example of a structure that includes the beaded panel.
Figure 16:
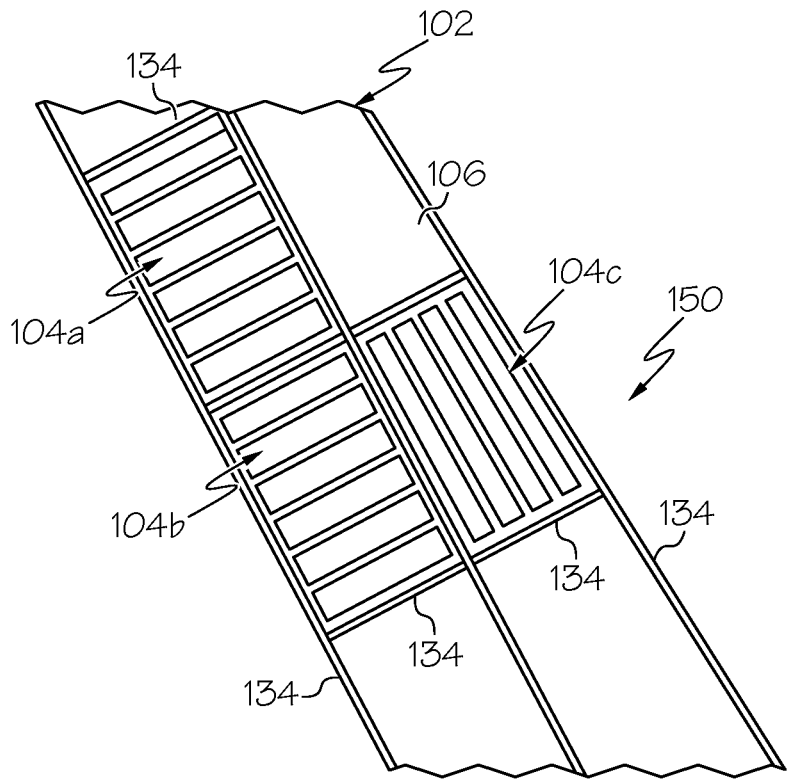
FIG. 16 is a schematic, perspective view of a portion of an example of a structure that includes the beaded panel.
Figure 31:
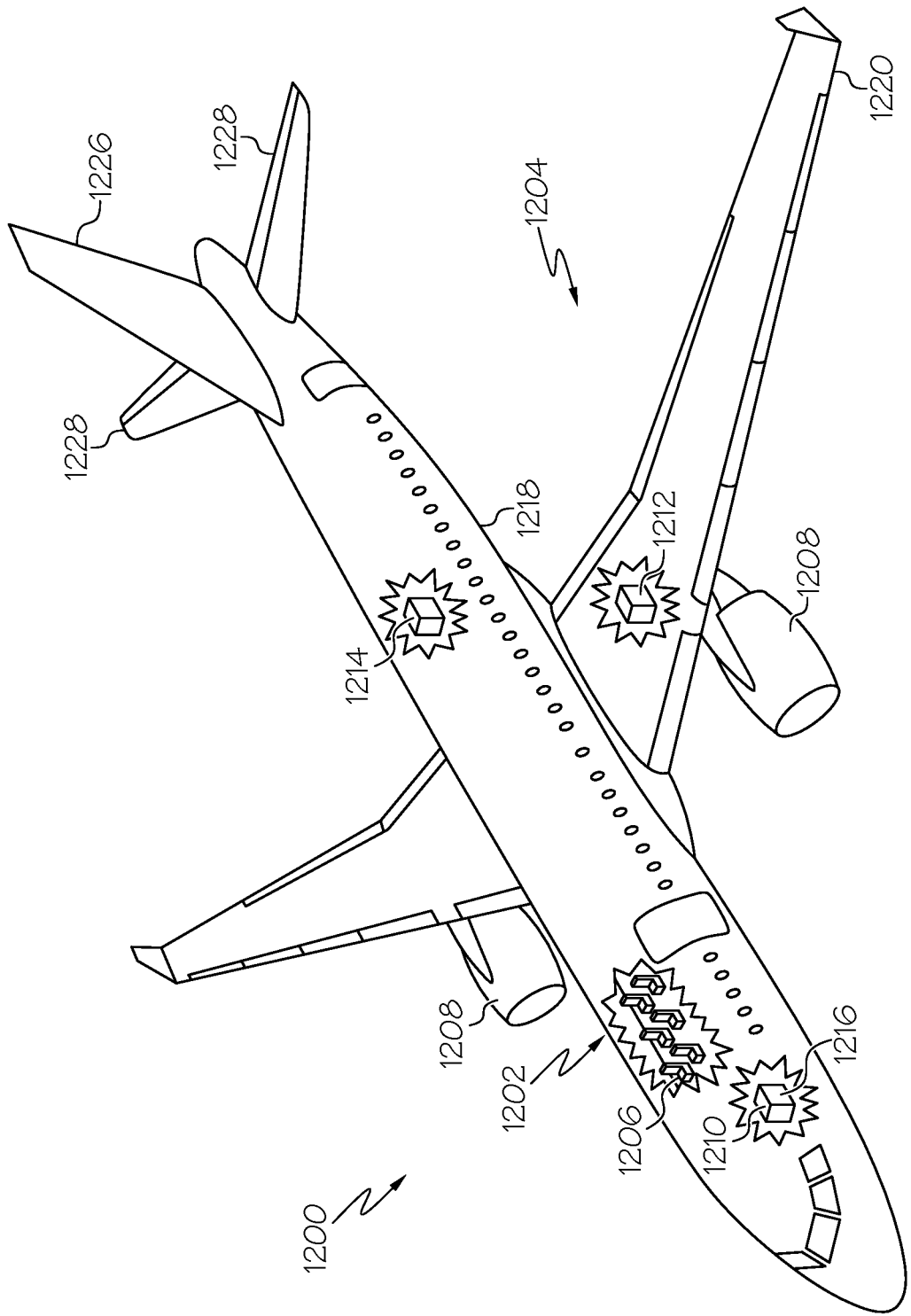
FIG. 31 is a schematic illustration of an example of an aircraft.

Referring now to FIGS. 15 and 16, which illustrate examples of a portion of the structure 150 that includes the beaded panel 100. In one or more examples, the structure 150 forms a component of an aircraft 1200 (e.g., as shown in FIG. 31). As examples, the structure 150 may form at least a portion of a wing 1220, a horizontal stabilizer 1228, a vertical stabilizer 1226, or other aircraft structure. In these examples, the base panel 102 of the beaded panel 100 forms a skin panel of the aircraft structure. The beaded panel doubler 104 and, more particularly, the beads 108 of the beaded panel doubler 104, form internal stiffeners for the skin panel of the aircraft structure. In one or more examples, the structural member 134 forms a longitudinal stringer, a spar, or a lateral rib of the aircraft structure.

In one or more examples, one or more of the beaded panel doublers 104 (e.g., first beaded panel doubler 104a and second beaded panel doubler 104b shown in FIGS. 15 and 16) are joined to base panel 102 such that the beads 108 of the beaded panel doubler 104 extend along a longitudinal axis of the aircraft structure, such as in the spanwise direction of the wing 1220, the horizontal stabilizer 1228, or the vertical stabilizer 1226.

In one or more examples, one or more of the beaded panel doublers 104 (e.g., third beaded panel doubler 104c shown in FIG. 16) are joined to base panel 102 such that the beads 108 of the beaded panel doubler 104 extend along a lateral axis of the aircraft structure, such as in the chordwise direction of the wing 1220, the horizontal stabilizer 1228, or the vertical stabilizer 1226.

In one or more examples, one or more of the beaded panel doublers 104 may be joined to the base panel 102 in selected locations, such as at locations where increased stiffness is needed or desired. In such examples, a portion of the surface 106 of the base panel 102 may not include the beaded panel doubler 104. As such, the beaded panel 100 may be tailored to suit a particular loading application to optimize an increase in stiffness (e.g., where needed) and reducing weight.

Figure 17:
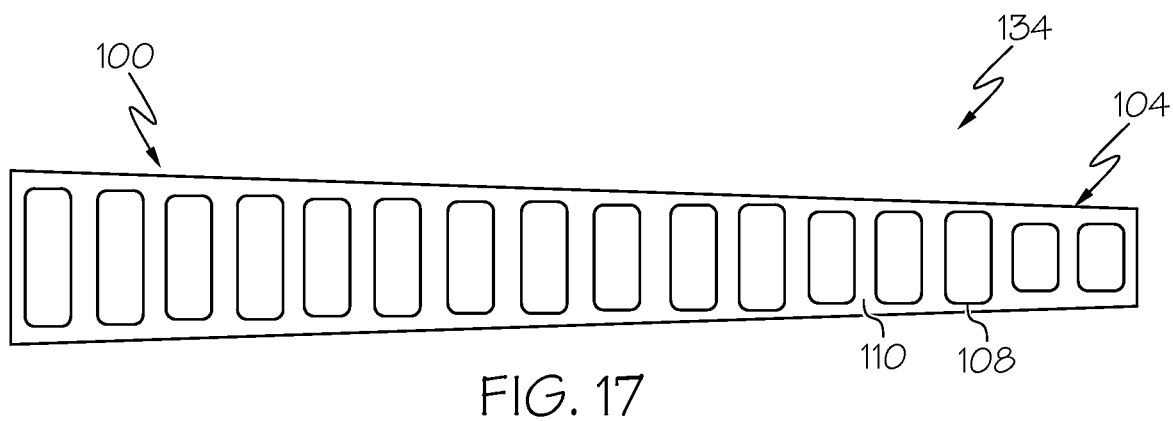
FIG. 17 is a schematic, elevation view of an example of the beaded panel doubler.
Figure 18:
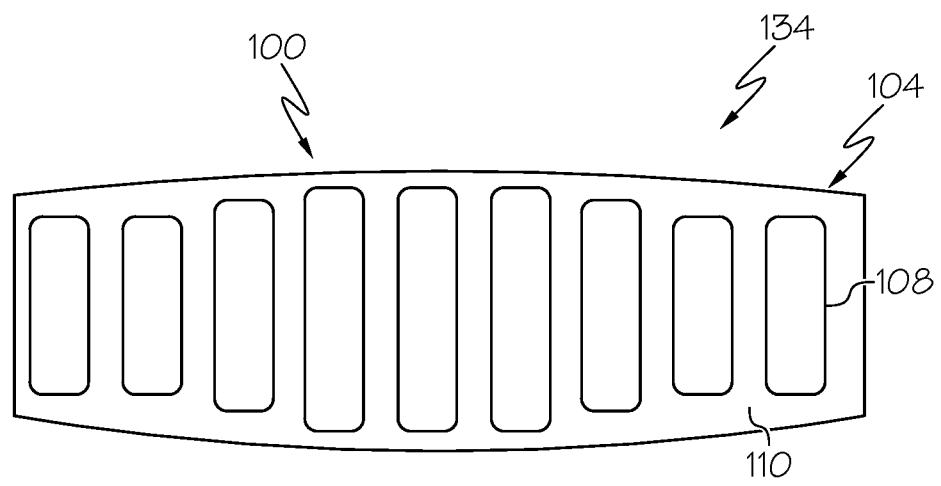
FIG. 18 is a schematic, elevation view of an example of the beaded panel doubler.
Figure 19:
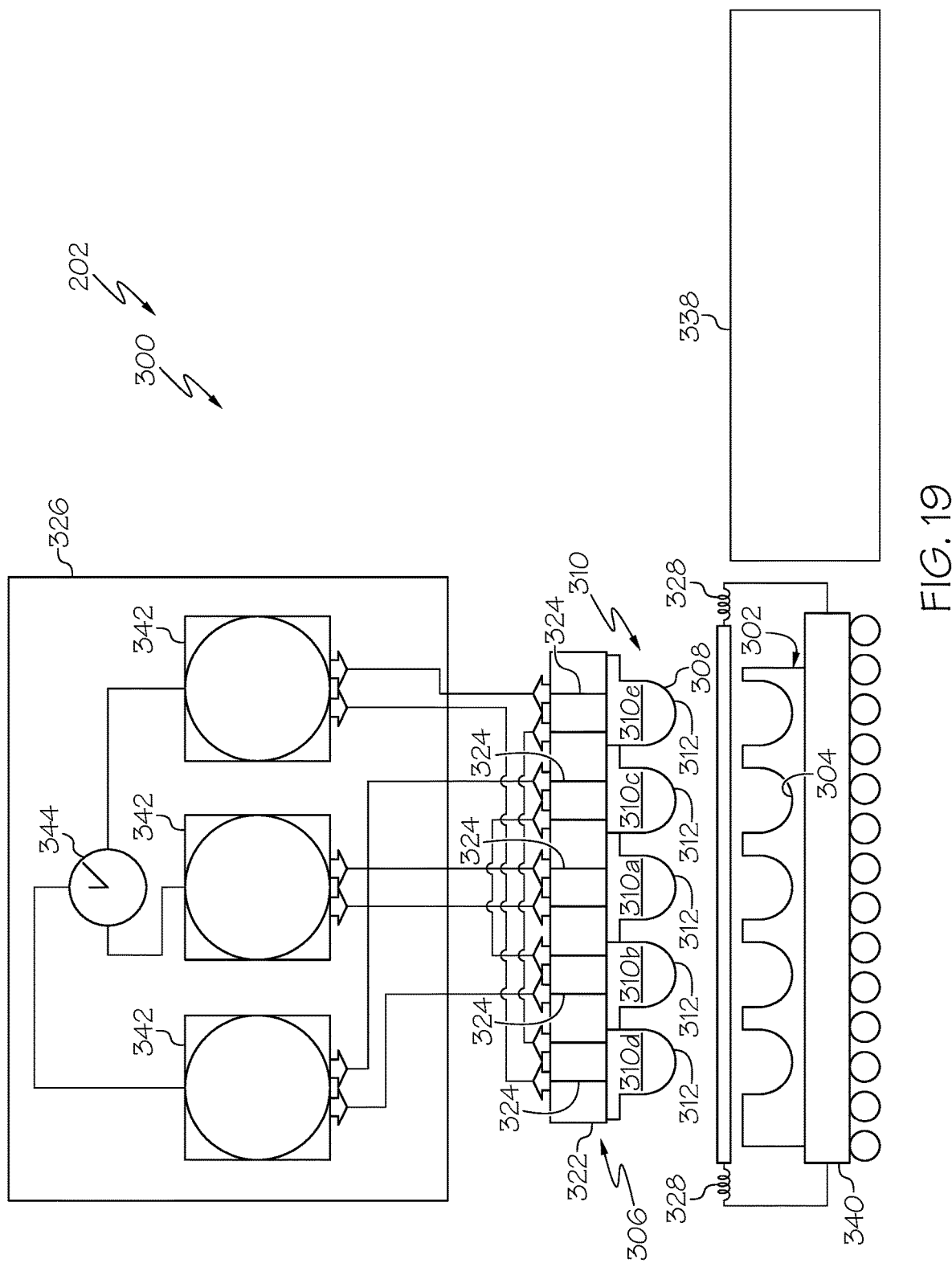
FIG. 19 is a schematic illustration of an example of a stamp forming apparatus for forming the beaded panel doubler.

FIGS. 17 and 18 illustrate examples of the beaded panel doubler 104 that is joined to the base panel 102 to form the beaded panel 100, which is used to fabricate the structural member 134. As shown in FIG. 17, in one or more examples, the beaded panel doubler 104 is joined to the base panel 102 to form the structural member 134, which is a spar of the aircraft structure (e.g., for the wing 1220, the horizontal stabilizer 1228, or the vertical stabilizer 1226). As shown in FIG. 18, in one or more examples, beaded panel doubler 104 is joined to the base panel 102 to form the structural member 134, which is a rib of the aircraft structure (e.g., for the wing 1220, the horizontal stabilizer 1228, or the vertical stabilizer 1226). As illustrated in FIGS. 17 and 18, the beaded panel doubler 104 and the base panel 102 may have various geometries, for example, based on the type or application of the structural member 134 formed from the beaded panel 100.

The beaded panel 100 may also be used to form other aircraft structures, such as, but not limited to, wing-like fin skin panels, wing-like spars, wing-like ribs, leading and trailing edge panels, wing-to-body fairing panels, doors (e.g., landing gear doors, maintenance access doors, etc.), flap hinge fairing, and the like.

Referring now to FIGS. 1 and 19-23, in one or more examples, the stamp forming apparatus 300 is configured to form the beaded panel doubler 104 made of the first fiber-reinforced thermoplastic composite 112. For example, the stamp forming apparatus 300 is configured to form the beaded panel doubler 104 from the blank 132 (e.g., as shown in FIG. 4).

In one or more examples, the stamp forming apparatus 300 includes a first die 302. The first die 302 includes a first die surface 304. The stamp forming apparatus 300 also includes a second die 306. The second die 306 includes a second die surface 308. The first die surface 304 and the second die surface 308 are complementary such that when the blank 132 is compressed between the first die 302 and the second die 306, the first die surface 304 and the second die surface 308 alter the cross-section of the base structure of the blank 132 and form the beads 108 and the web 110 of the beaded panel doubler 104.

In one or more examples, the second die 306 includes or is formed by a plurality of die segments 310. Each one of the die segments 310 is independent of the other and is movable relative to the first die 302 and relative to any other one of the die segments 310. Each one of the die segments 310 is individually actuated to compress a portion of the blank 132 between a respective one of the die segments 310 and the first die 302 form a portion of the beaded panel doubler 104, such as one of the beads 108 and a portion of the web 110.

Figure 21:
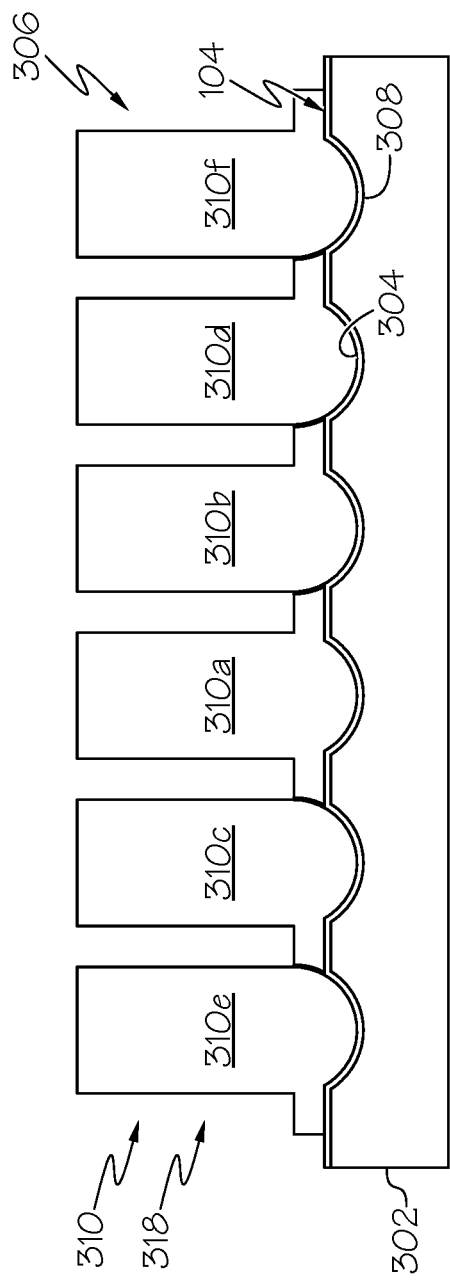
FIG. 21 is a schematic illustration of an example of a portion of the stamp forming apparatus, shown in FIG. 20, depicting a subsequent stage of the process for forming the beaded panel doubler.

Each one of the die segments 310 includes a die-surface segment 312 that forms or defines a portion of the second die surface 308. In other words, when all of the die segments 310 are actuated, the die-surface segments 312 of the die segments 310, in combination, form the second die surface 308, which is continuous (e.g., as shown in FIG. 21).

Figure 20:
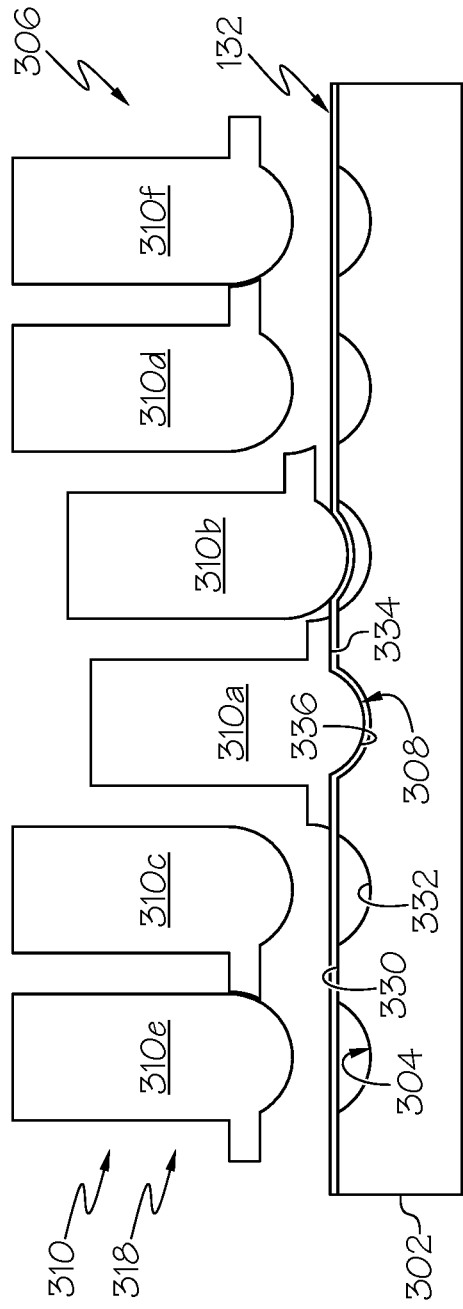
FIG. 20 is a schematic illustration of an example of a portion of the stamp forming apparatus, depicting a stage of a process for forming the beaded panel doubler.

Referring to FIG. 20, in one or more examples, the first die surface 304 includes a plurality of first-die-surface planar portions 330 and a plurality of first-die-surface concave portions 332. Each one of the die-surface segments 312 includes a die-segment-surface planar portion 334 and a die-segment-surface convex portion 336. The die-segment-surface planar portion 334 of the die-surface segment 312 of each die segment 310 is complementary to a corresponding one of the first-die-surface planar portions 330 of the first die surface 304 such that a portion of the web 110 of the beaded panel doubler 104 is formed between the die segment 310 and the first die 302 upon actuation of the die segment 310. The die-segment-surface convex portion 336 of each die segment 310 is complementary to a corresponding one of the first-die-surface concave portion 332 such that one of the beads 108 of the beaded panel doubler 104 is formed between the die segment 310 and the first die 302 upon actuation of the die segment 310. As such, it can be appreciated that each one of the die segments 310 corresponds to and is configured to form one of the beads 108 and a portion of the web 110 of the beaded panel doubler 104.

While the illustrated examples depict the die-surface convex portions belonging to the movable die segments 310 of the second die 306 and the die-surface concave portions belonging to the fixed first die 302, in other examples, the arrangement of the die-surface convex portions and the die-surface concave portions may be reversed. For example, the die-surface convex portions may belong to the fixed first die 302 and the die-surface concave portions may belong to the movable die segments 310 of the second die 306.

Referring now to FIGS. 20-23, in one or more examples, the die segments 310 are actuated according to a predetermined sequence to sequentially form the beads 108 and the web 110 in the base structure of the blank 132 resulting in formation of the beaded panel doubler 104. Sequential actuation of the die segments 310 enables the stamp forming apparatus 300 to sequentially form the beads 108 and the web 110 of the beaded panel doubler 104 without introducing wrinkles, tears, stretching, or other undesirable inconsistencies in the beaded panel doubler 104 during the stamp forming operation.

In one or more examples, each one of the beads 108 is sequentially formed between the die-surface segment 312 of one of the die segments 310 and a portion of the first die surface 304 of the first die 302. Each portion of the web 110 is sequentially formed between the die-surface segment 312 of one of the die segments 310 and a portion of the first die surface 304 of the first die 302. It can be appreciated that a bead 108 and a portion of the web 110, such as a portion directly adjacent to and extending from the bead 108, are formed concurrently by the same die segment 310.

In one or more examples, the die segments 310 are arranged in a linear series 318 such that the die-surface segment 312 of each one of the die segments 310 forms a portion of the second die surface 308 after all of the die segments 310 are actuated.

In FIGS. 19-23, the die segments 310 are individually identified as a first die segment 310a, a second die segment 310b, a third die segment 310c, a fourth die segment 310d, a fifth die segment 310e, and a sixth die segment 310f. In one or more examples, the numerical designation of each one of the die segments 310 (e.g., first, second, third, etc.) may refer to the sequential order of actuation.

Referring to FIGS. 20 and 21, in one or more examples, the predetermined sequence in which the die segments 310 are actuated is initiated at an approximate center or middle of the linear series 318 (e.g., or of the blank 132) and moves sequentially outward in an alternating or stepwise manner toward opposing ends of the linear series 318 (e.g., toward opposing edges of the blank 132). In these examples, the first die segment 310a is located at an approximate center or middle portion of the linear series 318 of the die segments 310 and may also be referred to as a center die segment. The second die segment 310b is situated or arranged at a first (e.g., right) side of the first die segment 310a and may also be referred to as a first outer die segment. The third die segment 310c is situated or arranged at a second (e.g., left) side of the first die segment 310a, opposite the second die segment 310b, and may also be referred to as a second outer die segment. The fourth die segment 310d is situated or arranged at a first (e.g., right) side of the second die segment 310b, opposite the first die segment 310a, and may also be referred to as a third outer die segment. The fifth die segment 310e is situated or arranged at a second (e.g., left) side of the third die segment 310c, opposite the first die segment 310a, and may also be referred to as a fourth outer die segment. The sixth die segment 310f is situated or arranged at a first (e.g., right) side of the fourth die segment 310d, opposite the second die segment 310b, and may also be referred to as a fifth outer die segment. This alternating outward arrangement of the die segments 310 continues for any remaining die segments 310.

In one or more examples, the predetermined sequence for actuation of the die segments 310 includes: (1) actuation of the first die segment 310a; (2) actuation of the second die segment 310b; and (3) actuation of the third die segment 310c. As another example, the predetermined sequence for actuation of the die segments 310 also includes: (4) actuation of the fourth die segment 310d; (5) actuation of the fifth die segment 310e, (6) actuation of the sixth die segment 310f; and so on for the remaining ones of the die segments 310.

In one or more examples, the predetermined sequence in which the die segments 310 are actuated is performed in an alternating outward manner. For example, following actuation of the first die segment 310a (e.g., center die segment), the remaining die segments 310 are alternatingly actuated one at a time in each opposing outward direction from the center the linear series 318. In one or more examples, the second die segment 310b is actuated after the first die segment 310a is actuated. In one or more examples, the third die segment 310c is actuated after the second die segment 310b is actuated. In one or more examples, the fourth die segment 310d is actuated after the third die segment 310c is actuated. In one or more examples, the fifth die segment 310e is actuated after the fourth die segment 310d is actuated. In one or more examples, the sixth die segment 310f is actuated after the fifth die segment 310e is actuated. This alternating actuation is repeated for the remaining ones of the die segments 310 until all the die segments 310 are actuated, for example, to form an entirety of the beaded panel doubler 104 (e.g., as shown in FIG. 21).

In one or more examples, the predetermined sequence in which the die segments 310 are actuated is performed in a stepwise outward manner. For example, following actuation of the first die segment 310a (e.g., center die segment), the remaining die segments 310 are actuated as opposing pairs in each opposing outward direction from the center of the linear series 318. In one or more examples, the second die segment 310b and the third die segment 310c are actuated approximately concurrently (e.g., approximately simultaneously) after the first die segment 310a is actuated. In one or more examples, the fourth die segment 310d and the fifth die segment 310e are actuated approximately concurrently (e.g., approximately simultaneously) after the second die segment 310b and the third die segment 310c are actuated. This stepwise actuation is repeated for remaining opposing pairs of the die segments 310 until all the die segments 310 are actuated, for example, to form an entirety of the beaded panel doubler 104 (e.g., as shown in FIG. 21).

Referring now to FIGS. 22 and 23, in one or more examples, the predetermined sequence in which the die segments 310 are actuated is initiated at an end of the linear series 318 (e.g., edge of the blank 132) and moves sequentially outward in a linear manner toward an opposing end of the linear series 318 (e.g., opposing edge of the blank 132). In these examples, the first die segment 310a is located at a first end of the linear series 318 of the die segments 310. The second die segment 310*b* is situated or arranged at a first (e.g., right) side of the first die segment 310*a*. The third die segment 310*c* is situated or arranged at a first (e.g., right) side of the second die segment 310*b*, opposite the first die segment 310*a*. The fourth die segment 310*d* is situated or arranged at a first (e.g., right) side of the third die segment 310*c*, opposite the second die segment 310*b*. The fifth die segment 310*e* is situated or arranged at a first (e.g., right) side of the fourth die segment 310*d*, opposite the third die segment 310*c*. The sixth die segment 310*f* is situated or arranged at a first (e.g., right) side of the fifth die segment 310*e*, opposite the fourth die segment 310*d*. This linearly outward arrangement of the die segments 310 continues for any remaining die segments 310.

In one or more examples, the predetermined sequence for actuation of the die segments 310 includes: (1) actuation of the first die segment 310*a*; (2) actuation of the second die segment 310*b*; and (3) actuation of the third die segment 310*c*. As another example, the predetermined sequence for actuation of the die segments 310 also includes: (4) actuation of the fourth die segment 310*d*; (5) actuation of the fifth die segment 310*e*, (6) actuation of the sixth die segment 310*f*; and so on for the remaining ones of the die segments 310.

In one or more examples, the predetermined sequence in which the die segments 310 are actuated is performed in the linearly outward manner. For example, following actuation of the first die segment 310*a*, the remaining die segments 310 are successively actuated one at a time in the outward direction from the first end of the linear series 318 to an opposed second end of the linear series 318. In one or more examples, the second die segment 310*b* is actuated after the first die segment 310*a* is actuated. In one or more examples, the third die segment 310*c* is actuated after the second die segment 310*b* is actuated. In one or more examples, the fourth die segment 310*d* is actuated after the third die segment 310*c* is actuated. In one or more examples, the fifth die segment 310*e* is actuated after the fourth die segment 310*d* is actuated. In one or more examples, the sixth die segment 310*f* is actuated after the fifth die segment 310*e* is actuated. This successive actuation is repeated for the remaining ones of the die segments 310 until all the die segments 310 are actuated, for example, to form an entirety of the beaded panel doubler 104 (e.g., as shown in FIG. 23).

Referring again to FIG. 19, in one or more examples, the second die 306 includes a former 322. The die segments 310 are coupled to the former 322. The former 322 supports the die segments 310 during actuation. Each one of the die segments 310 is movable relative to the former 322. In one or more examples, the former 322 is movable relative to the first die 302 to position the die segments 310 closer to the first die 302 and, thus, the blank 132 before actuation of the die segments 310 is performed to form the beaded panel doubler 104.

In one or more examples, the second die 306 includes actuators 324. The actuators 324 are configured to selectively actuate the die segments 310. In one or more examples, the actuators 324 are coupled to the former 322. Each one of the die segments 310 is coupled to a corresponding one of the actuators 324.

The actuators 324 may take any one of various forms or operate by any one of various methods. In one or more examples, each one of the actuators 324 is a linear actuator. In one or more examples, the actuators 324 are displacement-controlled actuators. In one or more examples, the actuators 324 are force-controlled actuators.

In one or more examples, the stamp forming apparatus 300 includes a controller 326. In one or more examples, the controller 326 is configured to selectively actuate (e.g., energize) each one of the actuators 324 to move each one of the die segments 310 according to the predetermined sequence of the die segments 310.

In one or more examples, the controller 326 includes a plurality of control units 342. In one or more examples, each one of the die segments 310 (e.g., each one of the actuators 324) is associated with and is selectively controlled by a dedicated one of the control units 342. In one or more examples, two or more of the die segments 310 (e.g., two or more of the actuators 324) are associated with and are selectively controlled by a shared or common control unit 342.

In one or more examples, the controller 326 includes a timer 344. The timer 344 is configured to control the timing of actuation of each one of the die segments 310 according to the predetermined sequence.

In one or more examples, a temperature of the second die 306 or each one of the die segments 310 is selectively controllable.

In one or more examples, each one of the die segments 310 is actively heated to increase the temperature of the die segments 310 during the stamp forming operation and prior to progressively forming the beaded panel doubler 104. In one or more examples, heating the die segments 310 actively heats the blank 132 before and/or during forming, such that the temperature of the blank 132 is increased to or is maintained at its pliability temperature and the blank 132 is moldable. In one or more examples, the blank 132 is pre-heated (e.g., in an infra-red oven) such that the temperature of the blank 132 is above the melt temperature. The blank 132 is then moved in-between the first die 302 and the second die 306 (e.g., by a shuttle) and the press and individual actuators of the die segments 310 are actuated. The first die 302 and/or the second die 306 is heated such that during the forming operation the blank 132 does not cool down too quickly, so that the material stays pliable until the desired shape is achieved.

As another example, each one of the die segments 310 is actively cooled to decrease the temperature of the die segments 310 during the stamp forming operation and after the beaded panel doubler 104 is formed. Cooling the die segments 310 actively cools the beaded panel doubler 104 after forming, such that the temperature of the beaded panel doubler 104 is decreased below its pliability temperature and the beaded panel doubler 104 hardens or solidifies.

In one or more examples, a temperature of the first die 302 is selectively controllable. As an example, the first die 302 is actively heated to increase the temperature of the first die 302 during the stamp forming operation and prior to progressively forming the beaded panel doubler 104. Heating the first die 302 actively heats the blank 132 before forming, such that the temperature of the blank 132 is increased to or is maintained at its pliability temperature and the blank 132 is moldable. As another example, the first die 302 is actively cooled to decrease the temperature of the first die 302 during the stamp forming operation and after the beaded panel doubler 104 is formed. Cooling the first die 302 actively cools the beaded panel doubler 104 after forming, such that the temperature of the beaded panel doubler 104 is decreased below its pliability temperature and the beaded panel doubler 104 hardens or solidifies.

The second die 306 or the die segments 310 and/or the first die 302 may be heated using any one of various suitable die heating devices or techniques. As an example, the second die 306, each one of the die segments 310, and/or the first die 302 includes a heating element. The heating element is disposed within, is coupled to, or is otherwise in thermal communication with an associated or respective die member (e.g., the second die 306, each one of the die segments 310, and/or the first die 302). The heating element may heat the associated die member in any suitable manner, such as, but not limited to, resistive heating, conductive heating, radiant heating, induction heating, and the like.

The second die 306 or the die segments 310 and/or the first die 302 may be cooled using any one of various suitable die cooling devices or techniques. As an example, the second die 306, each one of the die segments 310, and/or the first die 302 includes a cooling element. The cooling element is disposed within, is coupled to, or is otherwise in thermal communication with an associated or respective die member (e.g., the second die 306, each one of the die segments 310, and/or the first die 302). The cooling element may cool (e.g., remove heat from) the associated die member in any suitable manner.

In one or more examples, the controller 326 is configured to control the temperature of the second die 306 (e.g., each one of the die segments 310) and/or the first die 302. For example, the controller 326 may be in communication with the heating element(s) and/or the cooling element(s) and provide instructions (e.g., control signals) to the heating element(s) and/or the cooling element(s) to increase or decrease the temperature of an associated die member. In one or more examples, the stamp forming apparatus 300 may also include one or more temperature sensors. The temperature sensors are configured to detect the temperature of at least one of the blank 132, the first die 302, the second die 306, and/or each one of the die segments 310 during the stamp forming operation. The temperature sensors may provide a signal to the controller 326, which is used to control heating element(s) and/or the cooling element(s) (e.g., a temperature feedback control loop).

Referring still to FIG. 1, in one or more examples, the stamp forming apparatus 300 includes at least one restraining feature 328. The restraining feature 328 is configured to support the blank 132 between the first die 302 and the second die 306 (e.g., the die segments 310) prior to and/or during the stamp forming operation. In one or more examples, the restraining feature 328 applies tension to the blank 132 or otherwise biases the blank 132 in an outstretched configuration to prevent wrinkling, sagging, or bunching of the blank 132 when heated to its pliability temperature.

In one or more examples, the restraining feature 328 includes a biasing element, such as a spring, which is coupled to the blank 132. The restraining feature 328 (e.g., the biasing element) is configured to apply tension to the blank 132. The restraining feature 328 (e.g., the biasing element) is also configured to enable the blank 132 to progressively shorten (e.g., move inward from its ends) as the die segments 310 sequentially actuate to successively form the beads 108 and portions of the web 110.

In one or more examples, the stamp forming apparatus 300 includes a pre-heating device 338, such as an oven. The pre-heating device 338 is configured to preheat the blank 132 before the blank 132 is positioned between the first die 302 and the second die 306 for stamp forming. In one or more examples, the pre-heating device 338 is configured to heat the blank 132 to its pliability temperature such that the blank 132 is pliable or moldable and in a suitable condition for stamp forming.

In one or more examples, the stamp forming apparatus 300 includes a shuttle 340. The shuttle 340 is configured to support and/or transport the blank 132. For example, the shuttle 340 is configured to support and transport the blank 132 to and from the pre-heating device 338. The shuttle 340 is also configured to transport the blank 132 and support the blank 132 between the first die 302 and the second die 306 (e.g., the die segments 310) prior to and/or during the stamp forming operation.

In one or more examples, the restraining feature 328 is coupled to the shuttle 340, opposite the blank 132. In other examples, the restraining feature 328 is coupled to the first die 302, opposite the blank 132.

Referring now to FIGS. 24 and 25, in one or more examples, the welding apparatus 400 if configured for forming the beaded panel 100. For example, the welding apparatus 400 is used to join the beaded panel doubler 104 and the base panel 102 together.

In one or more examples, the welding apparatus 400 includes the jig 402. The jig 402 is configured to clamp the base panel 102 and the beaded panel doubler 104 together, for example, during a thermoplastic welding operation. The base panel 102 is made of the second fiber-reinforced thermoplastic composite 114. The beaded panel doubler 104 is made of the first fiber-reinforced thermoplastic composite 112.

The jig 402 is also configured to support and/or maintain the respective positions and/or shapes of the beaded panel doubler 104 and the base panel 102 as portions of the beaded panel doubler 104 and the base panel 102 are heated during the thermoplastic welding operation. It can be appreciated that a portion of the beaded panel doubler 104 and/or the base panel 102, such as a portion proximate to a thermoplastic weld location, may be heated proximate to or above their respective pliability temperature during the thermoplastic welding operation. As such, the jig 402 prevents the beaded panel doubler 104 and/or the base panel 102 from deforming during the thermoplastic welding operation.

In one or more examples, the jig 402 includes a jig first portion 402a and a jig second portion 402b. The jig first portion 402a is configured to support the beaded panel doubler 104 in an appropriate or desired position for thermoplastic welding (e.g., as shown in FIG. 24). The base panel 102 is then appropriately positioned relative to the beaded panel doubler 104 (e.g., is stacked on or positioned over), for example, such that the first surface 142 of the web 110 of the beaded panel doubler 104 is in contact with the surface 106 of the base panel 102 (e.g., as shown in FIG. 24). The jig second portion 402b is then coupled (e.g., fastened) to the jig first portion 402a to clamp the beaded panel doubler 104 and the base panel 102 between the jig first portion 402a and the jig second portion 402b (e.g., as shown in FIG. 25).

In one or more examples, the welding apparatus 400 also includes the welding head 406. The welding head 406 is configured to thermally weld the base panel 102 and the beaded panel doubler 104 together. In other words, the welding head 406 joins the base panel 102 and the beaded panel doubler 104 by thermoplastic welding. In one or more examples, the welding head 406 is positioned to thermally weld at least a portion of the web 110 of the beaded panel doubler 104 to the base panel 102.

In one or more examples, the welding apparatus 400 includes a movement device (not explicitly illustrated). The welding head 406 is coupled to the movement device. The movement device is configured to automatically move the welding head 406 along a predetermined welding path, for example, according to programmed instructions provided to the movement device by a computer control device. Examples of the automated movement device include, but are not limited to, a robotic arm, an overhead gantry, and the like.

In one or more examples, the welding apparatus 400 includes more than one welding head 406 (e.g., a plurality of welding heads 406). In these examples, multiple locations may be thermoplastic welded simultaneously. In these examples, each welding head 406 may be associated with a dedicated movement device that automatically controls the position of and moves a corresponding welding head 406 along its predetermined welding path.

In one or more examples, the jig 402 includes openings 404. The openings 404 provide access to a portion of at least one of the base panel 102 and the beaded panel doubler 104. As an example, the openings 404 are arranged to be aligned with or in registry with the web 110 of the beaded panel doubler 104.

In one or more examples, the welding head 406 thermally welds (e.g., via thermoplastic welding) the base panel 102 and the beaded panel doubler 104 together along the openings 404. For example, the welding head 406 is movable along each one of the openings 404 to thermally weld at least a portion of the web 110 of the beaded panel doubler 104 and the base panel 102 together along the opening 404.

In one or more examples, as shown in FIGS. 24 and 25, the openings 404 are formed through the jig second portion 402b. The openings 404 are aligned with, in registry with, or extend along an interface between the first surface 142 of the web 110 of the beaded panel doubler 104 and the surface 106 of the base panel 102. The openings 404 provide access for the welding head 406 to a surface of the base panel 102, opposite the interface between the first surface 142 of the web 110 of the beaded panel doubler 104 and the surface 106 of the base panel 102.

In other examples (not explicitly shown), the openings 404 are formed through the jig first portion 402a. The openings 404 are aligned with, in registry with, or extend along an interface between the first surface 142 of the web 110 of the beaded panel doubler 104 and the surface 106 of the base panel 102. The openings 404 provide access for the welding head 406 to the second surface 144 of the beaded panel doubler 104, opposite the interface between the first surface 142 of the web 110 of the beaded panel doubler 104 and the surface 106 of the base panel 102.

In one or more examples, the jig first portion 402a includes supports 420. The supports 420 are configured or arranged to support the beaded panel doubler 104. For example, the supports 420 are spaced apart from each other such that open regions 422 are formed between directly adjacent ones of the supports 420. Each one of the open regions 422 is configured to receive or accommodate at least a portion of a respective one of the beads 108 (e.g., the protrusion 118 projecting from the web 110) of the beaded panel doubler 104. In one or more examples, each one of the supports 420 is situated to contact the second surface 144 of a portion of the web 110 of the beaded panel doubler 104 such that the beaded panel doubler 104 is supported on the supports 420 by the web 110 and each one of the beads 108 is positioned in a respective one of the open regions 422. In one or more examples, the supports 420 are situated or arranged to be aligned with, to be in registry with, or to extend along the openings 404 when the jig second portion 402b is coupled to the jig first portion 402a.

Referring again to FIG. 1, in one or more examples, the welding head 406 includes an induction welder 408.

In one or more examples, induction welding enables the heating and compaction functions to be separate from each other. In one or more examples, induction welding may enable the jig 402 to not have the openings 404, as long as the jig 402 is not electrically conductive or ferromagnetic. Additionally, induction welding provides faster reaction times. For example, the part is heated from the inside (e.g., needs carbon fibers or some conductive material at the weld interface, such as a metal or carbon mesh). Induction welding enables the welding head 406 to easily move along a weld line. Induction welding also enables use of the same welding head 406 for different parts and only adjust the process, clamping and compaction parameters.

In one or more examples, the welding head 406 includes an ultrasonic welder 410.

In one or more examples, ultrasonic welding is independent of the fiber reinforcement material used to form the composite part. Ultrasonic welding enables the weld heading 406 to easily move along the weld line. Additionally, ultrasonic welding is good for "spot" welding. Ultrasonic welding enables use of the same welding head 406 for different parts and only adjust the process, clamping and compaction parameters.

In one or more examples, the welding head 406 includes a resistance welder 412.

In one or more examples, resistance welding enables an entire weld line to be formed without having to move the welding head 406 (e.g., a conductor is needed at the weld line). Resistance welding eliminates the need to access to the outer surfaces of the parts, so compaction is not hindered by the heater or welding head 406.

In one or more examples, the welding head 406 includes a hot plate welder 414.

In one or more examples, hot plate welding can be used at the entire weld joint all at once. For larger surfaces that are not in a linear line, hot plate welding may be faster than the other welding techniques. In hot plate welding, heating and compaction functions are combined. Hot plate welding is also independent of the type of fiber reinforcement material used to form the parts.

In one or more examples, the welding apparatus 400 includes a compactor 416. The compactor 416 is configured to compress or compact a portion of the base panel 102 and the beaded panel doubler 104 during thermal welding (e.g., via the welding head 406). In one or more examples, the compactor 416 is configured to be selectively situated to compress a portion of the base panel 102 and the beaded panel doubler 104 against the jig 402 during thermal welding. In one or more examples, the compactor 416 is configured to be selectively situated to compress or compact a portion of the base panel 102 and a portion of the web 110 of the beaded panel doubler 104 against the jig 402 during thermal welding.

In one or more examples, as shown in FIG. 25, the compactor 416 is configured to be positioned in and/or to be movable along each one of the openings 404. As such, the compactor 416 is configured to be selectively situated to compress or compact a portion of the base panel 102 and a portion of the web 110 of the beaded panel doubler 104 against one of the supports 420 of the jig 402 during thermal welding.

In one or more examples, the compactor 416 is a separate component from and is independent of the welding head 406. The compactor 416 is positioned, for example, within one of the openings 404 to compress or compact a portion of the base panel 102 and a portion of the web 110 of the beaded panel doubler 104 against one of the supports 420 of the jig 402, such that the compactor 416 is positioned between the welding head 406 and the base panel 102 or the beaded panel doubler 104. In these examples, the welding apparatus 400 includes a second movement device (not explicitly illustrated). The compactor 416 is coupled to the second movement device. The second movement device is configured to automatically move and/or position the compactor 416, for example, according to programmed instructions provided to the second movement device by a computer control device. Examples of the automated second movement device include, but are not limited to, a robotic arm, an overhead gantry, and the like. In one or more examples, the movement device associated with the welding head 406 and the second movement device associated with the compactor 416 is the same movement device (e.g., a single movement device is configured to move and position both the welding head 406 and the compactor 416).

In one or more examples, the compactor 416 is coupled to or is otherwise formed by a portion of the welding head 406 (e.g., the welding head 406 includes the compactor 416). In these examples, the compactor 416 is positioned ahead (e.g., in front of) the welding head 406 such that the compactor 416 contacts the base panel 102 or the beaded panel doubler 104 (e.g., depending upon the configuration of the openings 404) to compress or compact the base panel 102 and the beaded panel doubler 104 against the jig 402.

In one or more examples, the compactor 416 and the welding head 406 are the same component. For example, the compactor 416 is the heating element of the welding head 406, such as with hot plate welding.

Generally, the compactor 416 is made of a suitable material as to not interfere with the thermoplastic welding operation performed by the welding head 406. The material selected for the compactor 416 may depend on the type of welding head 406 and/or the type of thermoplastic welding operation being performed by the welding head 406. For example, the compactor 416 is configured to facilitate heating (e.g., through the compactor 416) of the base panel 102 and the beaded panel doubler 104 to their respective melting temperatures or thermoplastic states for joining by the welding head 406.

Referring now to FIGS. 26 and 27, in one or more examples, the welding head 406 is configured to thermally weld the structural member 134 to at least one of the beaded panel doubler 104 and/or the base panel 102. The structural member 134 is made of the third fiber-reinforced thermoplastic composite 136.

In one or more examples, the welding apparatus 400 includes a strongback 418. The strongback 418 is configured to be situated relative the jig 402. The strongback 418 is configured to support the structural member 134 during thermal welding using the welding head 406. For example, the strongback 418 is appropriately configured (e.g., sized and/or shaped) and positioned to contact and support at least a portion of a surface of the structural member 134. The strongback 418 maintains the position and/or shape of the structural member 134 as portions of the structural member 134 are heated during the thermoplastic welding operation. It can be appreciated that a portion of the structural member 134, such as a portion proximate to a thermoplastic weld location, may be heated proximate to or above its pliability temperature during the thermoplastic welding operation. As such, the strongback 418 prevents the beaded structural member 134 from deforming during the thermoplastic welding operation.

In one or more examples, the compactor 416 is configured to be selectively situated to compress a portion of the base panel 102, a portion of the beaded panel doubler 104, and a portion of the structural member 134 together during thermal welding.

In one or more examples, as illustrated in FIG. 26, the compactor 416 is configured to be selectively situated to compress a portion of the base panel 102, a portion of the beaded panel doubler 104, and a portion of the structural member 134 against the jig 402 during thermal welding using the welding head 406.

In one or more examples, as illustrated in FIG. 27. the compactor 416 and the strongback 418 are each configured to be selectively situated to compress or compact a portion of the base panel 102, a portion of the beaded panel doubler 104, and a portion of the structural member 134 between the compactor 416 and the strongback 418 during thermal welding using the welding head 406.

In one or more examples, as illustrated in FIG. 27, the welding head 406 is configured to thermally weld the structural member 134 to the beaded panel doubler 104 along at least one of the openings 404 of the jig 402.

Referring now to FIG. 28, which illustrates an example temperature profile over time of an example thermoplastic welding operation. As shown, the fiber-reinforced thermoplastic composites are heated to a first temperature or first temperature range T1 that is equal to or above the welding temperature Tw of the fiber-reinforced thermoplastic composites. The fiber-reinforced thermoplastic composites are held within the first temperature range T1 (e.g., at the welding temperature Tw), and under pressure, for a sufficient period to allow the molecules in the thermoplastic matrix materials of the fiber-reinforced thermoplastic composites to newly position themselves and bond with each other. The fiber-reinforced thermoplastic composites are then cooled to a second temperature or second temperature range T2 that is equal to or below the crystallization temperature Tc of the fiber-reinforced thermoplastic composites. The fiber-reinforced thermoplastic composites are held within the second temperature range T2 (e.g., at the crystallization temperature Tw), and under pressure, for a sufficient period to allow the thermoplastic matrix materials of the fiber-reinforced thermoplastic composites to solidify.

Figure 29:
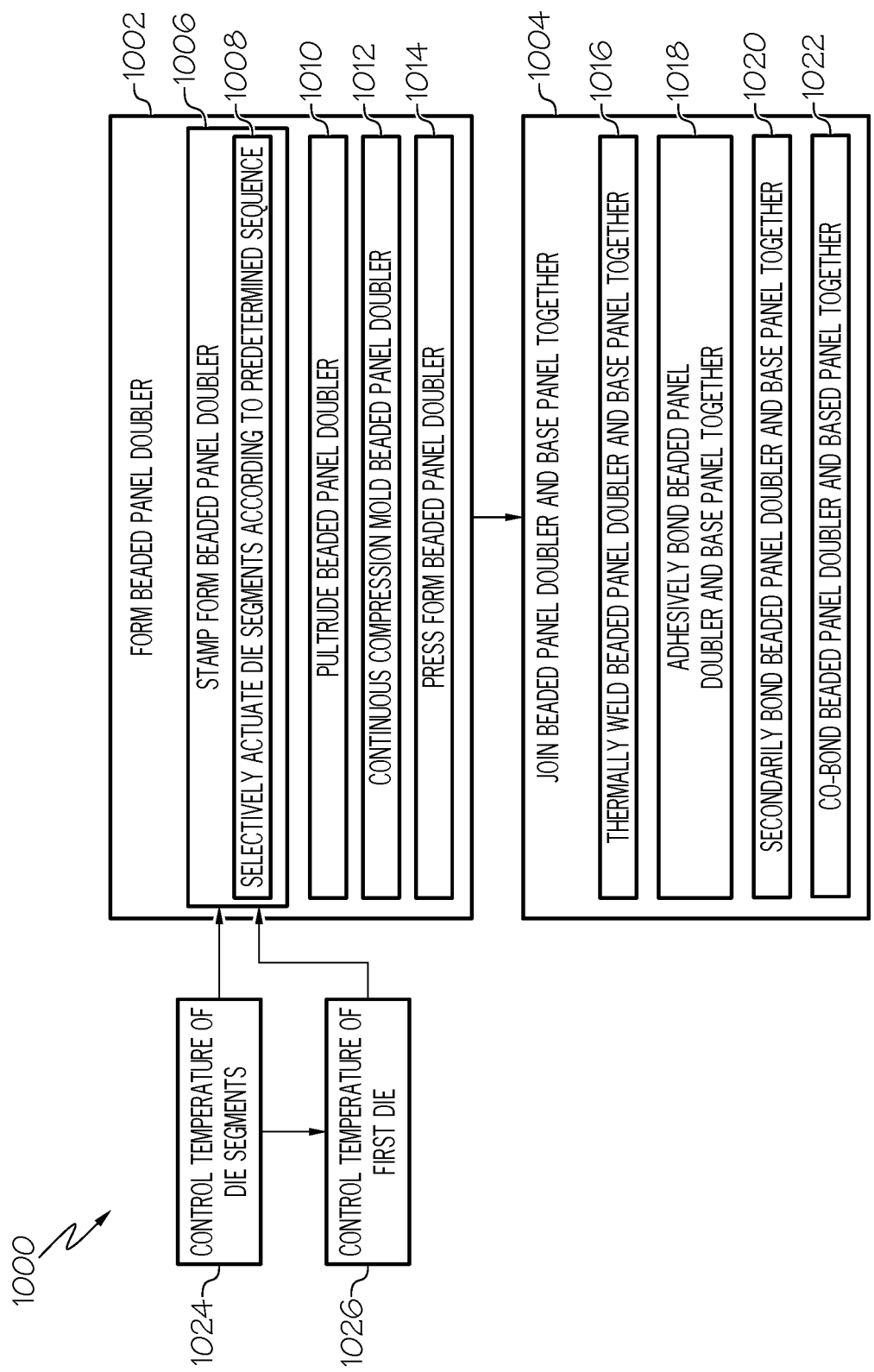
FIG. 29 is a flow diagram of an example of a method for forming a beaded panel.

Referring generally to FIGS. 1-28 and particularly to FIG. 29, by way of examples, the present disclosure is additionally directed to a method 1000 for forming the beaded panel 100. In one or more examples, the method 1000 is implemented using the system 200.

In one or more examples, the method 1000 includes a step of (block 1002) forming the beaded panel doubler 104. The beaded panel doubler 104 is made of the first fiber-reinforced thermoplastic composite 112. The beaded panel doubler 104 includes the beads 108 and the web 110 that interconnects the beads 108.

In one or more examples, the method 1000 includes a step of (block 1004) joining at least a portion of the web 110 of the beaded panel doubler 104 and the base panel 102 together. For example, at least a portion of the web 110 of the beaded panel doubler 104 is joined to the base panel 102.

In one or more examples, the step of (block 1002) forming the beaded panel doubler 104 includes a step of (block 1006) stamp forming the beaded panel doubler 104. Stamp forming is a fast, energy-efficient way of forming the beaded panel doubler 104 made of the first fiber-reinforced thermoplastic composite 112.

In one or more examples, the step of (block 1006) stamp forming the beaded panel doubler 104 includes a step of (block 1008) selectively actuating the die segments 310 of the second die 306 relative to the first die 302 according to the predetermined sequence to sequentially form the beads 108 and to sequentially form portions of the web 110.

In one or more examples, the die segments 310 are arranged in the linear series 318 such that the die-surface segment 312 of each one of the die segments 310 forms a portion of the second die surface 308 when an entirety (e.g., all) of the die segments 310 are actuated.

In one or more examples, the step of (block 1008) selectively actuating the die segments 310 relative to the first die 302 according to the predetermined sequence includes a step of actuating the first die segment 310a of the die segments 310. The step of (block 1008) selectively actuating the die segments 310 according to the predetermined sequence includes a step actuating the second die segment 310b. In one or more examples, the step of actuating the second die segment 310b is performed after the step of actuating the center die segment 310a. The step of (block 1008) selectively actuating the die segments 310 according to the predetermined sequence includes a step actuating the third die segment 310c. In one or more examples, the step of actuating the third die segment 310c is performed after the step of actuating the second outer die segment 310b. In one or more examples, the step of actuating the second die segment 310b and the step of actuating the third outer die segment 310c are performed concurrently (e.g., approximately simultaneously).

In one or more examples, the step of (block 1002) forming the beaded panel doubler 104 includes a step of (block 1010) pultruding the beaded panel doubler 104.

In one or more examples, the step of (block 1002) forming the beaded panel doubler 104 includes a step of (block 1012) continuous compression molding the beaded panel doubler 104.

In one or more examples, the step of (block 1002) forming the beaded panel doubler 104 includes a step of (block 1014) press forming the beaded panel doubler 104.

In one or more examples, the base panel 102 is made of the second fiber-reinforced thermoplastic composite 114.

In one or more examples, the step of (block 1004) joining at least the portion of the web 110 of the beaded panel doubler 104 and the base panel 102 together includes a step of (block 1016) thermally (e.g., thermoplastic) welding the beaded panel doubler 104 and the base panel 102 together. For example, at least the portion of the web 110 of the beaded panel doubler 104 and the base panel 102 are thermally welded together.

In one or more examples, the base panel 102 is made of the fiber-reinforced thermoset composite 116.

In one or more examples, the step of (block 1018) joining at least the portion of the web 110 of the beaded panel doubler 104 and the base panel 102 together includes a step of (block 1018) adhesively bonding at least the portion of the web 110 of the beaded panel doubler 104 and the base panel 102 together.

In one or more examples, the step of (block 1004) joining at least the portion of the web 110 of the beaded panel doubler 104 and the base panel 102 together includes a step of (block 1020) secondary bonding at least the portion of the web 110 of the beaded panel doubler 104 and the base panel 102 together.

In one or more examples, the step of (block 1004) joining at least the portion of the web 110 of the beaded panel doubler 104 and the base panel 102 together includes a step of (block 1022) co-bonding at least the portion of the web 110 of the beaded panel doubler 104 and the base panel 102 together.

In one or more examples, the method 1000 includes a step of (block 1024) selectively controlling the temperature of the second die 306, such as each one of the die segments 310 of the second die 306.

In one or more examples, the method 1000 includes a step of (block 1026) selectively controlling the temperature of the first die 302.

The beaded panel 100, the system 200, the stamp forming apparatus 300, the welding apparatus 400, the method 1000, and the structure 150 that includes the beaded panel 100 may provide various benefits and/or advantages over traditional panel forming and stiffening techniques. As an example, stamp forming the beaded panel doubler 104 enables the beaded panel doubler 104 to be manufactured at a higher rate and with lower energy consumption and lower recurring costs compared to current composite stiffener fabrication methods. As another example, the beaded panel 100 may replace traditional honeycomb structures, which may provide reductions in weight and improved automation capabilities. As another example, multiple joints between the beaded panel doubler 104 and the base panel 102 provided multiple thermoplastic weld interfaces, which may provide redundancy and limit the impact of delamination or disbonding occurring at the interface between the beaded panel doubler 104 and the base panel 102.

Figure 30:
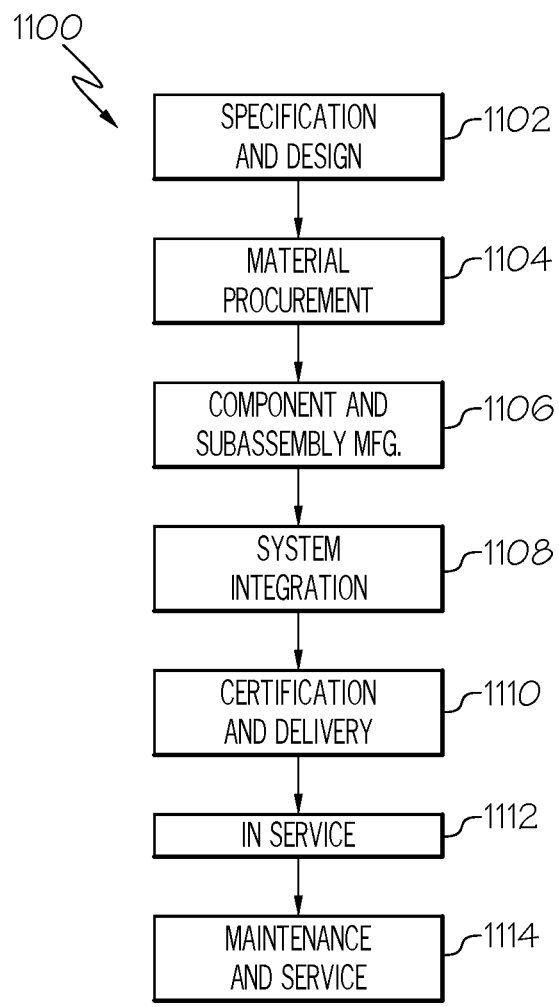
FIG. 30 is a flow diagram of an example of an aircraft manufacturing and service method.

Referring now to FIGS. 30 and 31, examples of the beaded panel 100, the system 200, the stamp forming apparatus 300, the welding apparatus 400, and the method 1000, and the structure 150 that includes beaded panel 100 may be related to, or used in the context of, an aircraft manufacturing and service method 1100, as shown in the flow diagram of FIG. 30 and the aircraft 1200, as schematically illustrated in FIG. 31. For example, the aircraft 1200 and/or the aircraft production and service method 1100 may utilize the structure 150 that includes the beaded panel 100, which is made using the system 200, the stamp forming apparatus 300, and/or the welding apparatus 400 and/or according to the method 1000.

Referring to FIG. 31, examples of the aircraft 1200 may include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, an environmental system 1214, and a communication system 1216. In other examples, the aircraft 1200 may include any number of other types of systems, such as a flight control system, a guidance system, a weapons system, and the like. In one or more examples, the structure 150 that includes the beaded panel 100, made using the system 200, the stamp forming apparatus 300, and/or the welding apparatus 400 and/or according to the method 1000 forms a component of the airframe 1202, such as a wing 1220, a fuselage 1218, a horizontal stabilizer 1228, a vertical stabilizer 1226 or a panel, a stringer, a spar, and the like thereof.

Referring to FIG. 30, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 30 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the beaded panel 100, the system 200, the stamp forming apparatus 300, the welding apparatus 400, the method 1000, and the structure 150 that includes beaded panel 100, shown and described herein, may be employed during any one or more of the stages of the manufacturing and service method 1100 shown in the flow diagram illustrated by FIG. 30. In an example, manufacture of the beaded panel 100 and/or the structure 150 that includes the beaded panel 100 made in accordance with the method 1000 and/or using the system 200, the stamp forming apparatus 300, and/or the welding apparatus 400 may form a portion of component and subassembly manufacturing (block 1106) and/or system integration (block 1108). Further, the beaded panel 100 and/or the structure 150 that includes the beaded panel 100 made in accordance with the method 1000 and/or using the system 200, the stamp forming apparatus 300, and/or the welding apparatus 400 may be utilized in a manner similar to components or subassemblies prepared while the aircraft 1200 is in service (block 1112). Also, the beaded panel 100 and/or the structure 150 that includes the beaded panel 100 made in accordance with the method 1000 and/or using the system 200, the stamp forming apparatus 300, and/or the welding apparatus 400 may be utilized during system integration (block 1108) and certification and delivery (block 1110). Similarly, manufacture of the beaded panel 100 and/or the structure 150 that includes the beaded panel 100 in accordance with the method 1000 and/or using the system 200, the stamp forming apparatus 300, and/or the welding apparatus 400 may be utilized, for example and without limitation, while the aircraft 1200 is in service (block 1112) and during maintenance and service (block 1114). For example, spare and or replacement composite parts may be fabricated in accordance with the method 1000 and/or using the system 200, the stamp forming apparatus 300, and/or the welding apparatus 400, which may be installed due to a prescribed maintenance cycle or after a realization of damage to the composite part.

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to composite component assemblies and systems and methods of making the same for other types of vehicles (e.g., land vehicles, marine vehicles, space vehicles, etc.) and standalone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Temperatures (e.g., welding temperatures and crystallization temperatures) and temperature ranges provided herein for thermoplastic welding the fiber-reinforced thermoplastic composites are provided as examples and other temperatures or ranges of temperatures, for example, less than or greater than the example temperatures or ranges of temperatures, may be implemented without departing from the intended function of the system and apparatuses, without departing from the intended implementation of the method, and without departing from the principles and purpose of the present disclosure.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "a number of" refers to one or more items.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-28 and 31, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-28 and 31, referred to above, need be included in every example and not all elements, features, and/or components described herein are necessarily depicted in each illustrative example. Accordingly, some of the elements, features, and/or components described and illustrated in FIGS. 1-28 and 31 may be combined in various ways without the need to include other features described and illustrated in FIGS. 1-28 and 31, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-28 and 31, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-28 and 31, and such elements, features, and/or components may not be discussed in detail herein with reference to each of FIGS. 1-28 and 31. Similarly, all elements, features, and/or components may not be labeled in each of FIGS. 1-28 and 31, but reference numerals associated therewith may be utilized herein for consistency.

In FIGS. 29 and 30, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 29 and 30 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the beaded panel 100, the system 200, the stamp forming apparatus 300, the welding apparatus 400, the method 1000, and the structure 150 that includes beaded panel 100 have been shown and described, modifications may occur to those skilled in the art upon reading the specification. The present application includes such modifications and is limited only by the scope of the claims.

What is claimed is:

1. A beaded panel comprising:
   a base panel; and
   a beaded panel doubler comprising beads and a web that interconnects the beads,
   wherein:
   at least a portion of the web of the beaded panel doubler is joined to the base panel to supplement a stiffness of the base panel; and
   at least one of the beads of the beaded panel doubler comprises a closed end.

2. The beaded panel of claim 1, wherein the beaded panel doubler is joined to the base panel by thermoplastic welding.

3. The beaded panel of claim 1, wherein the beaded panel doubler is joined to the base panel by adhesive bonding.

4. The beaded panel of claim 1, further comprising a second beaded panel doubler that comprises second beads and a second web that interconnect the second beads, wherein at least a portion of the second web of the second beaded panel doubler is joined to a based surface of the base panel.

5. The beaded panel of claim 4, wherein:
a first end portion of the web of the beaded panel doubler is joined to the base surface of the base panel; and
a second end portion of the second web of the second beaded panel doubler overlaps and is joined to the first end portion of the web of the beaded panel doubler.

6. The beaded panel of claim 1, wherein:
the base panel comprises a first fiber-reinforced thermoplastic composite layer that forms a base-contact surface of the base panel and a second fiber-reinforced thermoplastic composite layer;
the beaded panel doubler comprises a third fiber-reinforced thermoplastic composite layer that forms a doubler-contact surface of the beaded panel doubler and a fourth fiber-reinforced thermoplastic composite layer; and
a melting temperature of the first fiber-reinforced thermoplastic composite layer and the third fiber-reinforced thermoplastic composite layer is less than a melting temperature of the second fiber-reinforced thermoplastic composite layer and the fourth fiber-reinforced thermoplastic composite layer.

7. The beaded panel of claim 1, wherein the beaded panel doubler is joined to the base panel by secondary bonding.

8. The beaded panel of claim 1, wherein the beaded panel doubler is joined to the base panel by co-bonding.

9. The beaded panel of claim 1, wherein:
the beaded panel doubler is made of a first fiber-reinforced thermoplastic composite;
the base panel is made of a second fiber-reinforced thermoplastic composite; and
the first fiber-reinforced thermoplastic composite and the second fiber-reinforced thermoplastic composite are the same.

10. The beaded panel of claim 1, wherein:
the beaded panel doubler is made of a first fiber-reinforced thermoplastic composite;
the base panel is made of a second fiber-reinforced thermoplastic composite; and
the first fiber-reinforced thermoplastic composite and the second fiber-reinforced thermoplastic composite are different.

11. The beaded panel of claim 10, wherein the first fiber-reinforced thermoplastic composite and the second fiber-reinforced thermoplastic composite are compatible.

12. The beaded panel of claim 1, wherein:
the beaded panel doubler is made of a fiber-reinforced thermoplastic composite;
the base panel is made of a fiber-reinforced thermoset composite.

13. The beaded panel of claim 1, wherein:
each one of the beads of the beaded panel doubler comprises a first end and a second end that is opposite the first end;
the first end of each one of the beads is closed; and
the second end of each one of the beads is closed.

14. The beaded panel of claim 1, wherein the beads and the web of the beaded panel doubler are formed by one of stamp forming, pultrusion, continuous compression molding, and press forming.

15. A beaded panel comprising:
a base panel;
a first beaded panel doubler comprising first beads and a first web that interconnects the first beads; and
a second beaded panel doubler comprising second beads and a second web that interconnects the second beads, wherein:
a first end portion of the first web of the first beaded panel doubler is joined to the base surface of the base panel; and
a second end portion of the second web of the second beaded panel doubler overlaps and is joined to the first end portion of the first web of the first beaded panel doubler.

16. The beaded panel of claim 15, wherein:
the first end portion of the first web of the first beaded panel doubler is joined to the base panel by at least one of thermoplastic welding, adhesive bonding, secondary bonding, and co-bonding; and
the second end portion of the second web of the second beaded panel doubler is joined to the first end portion of the first web of the first beaded panel doubler by at least one of thermoplastic welding, adhesive bonding, secondary bonding, and co-bonding.

17. The beaded panel of claim 15, wherein at least one of the first beads of the first beaded panel doubler comprises a closed end.

18. The beaded panel of claim 15, wherein:
each one of the first beads of the first beaded panel doubler and each one of the second beads of the second beaded panel doubler comprises a first end and a second end that is opposite the first end;
the first end is closed; and
the second end is closed.

19. The beaded panel of claim 15, wherein:
the first beaded panel doubler and the second beaded panel doubler are made of a first fiber-reinforced thermoplastic composite; and
the base panel is made of one of a second fiber-reinforced thermoplastic composite or a fiber-reinforced thermoset composite.

* * * * *